US006518004B2

(12) United States Patent
Hashimoto

(10) Patent No.: US 6,518,004 B2
(45) **Date of Patent: *Feb. 11, 2003**

(54) POLYESTER SUPPORT AND SILVER HALIDE PHOTOGRAPHIC MATERIAL

(75) Inventor: Kiyokazu Hashimoto, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/748,200

(22) Filed: Dec. 27, 2000

(65) Prior Publication Data

US 2002/0039710 A1 Apr. 4, 2002

(30) Foreign Application Priority Data

Dec. 27, 1999 (JP) ........................................ 11-370351
Mar. 22, 2000 (JP) ........................................ 2000-080628

(51) Int. Cl.$^7$ .......................... G03C 3/00; G03C 1/795; B32B 27/06; B32B 27/36

(52) U.S. Cl. ....................... 430/501; 430/533; 430/939; 428/141; 428/220; 428/480

(58) Field of Search ................................ 430/501, 533, 430/939; 428/141, 220, 480

(56) References Cited

U.S. PATENT DOCUMENTS

| | | | | |
|---|---|---|---|---|
| 4,390,683 A | * 6/1983 | Yatsu et al. | ................. | 428/480 |
| 5,368,997 A | * 11/1994 | Kawamoto | .................. | 430/533 |
| 5,580,707 A | * 12/1996 | Kawamoto | .................. | 430/533 |
| 5,914,220 A | * 6/1999 | Murayama | .................. | 430/533 |
| 6,132,951 A | * 10/2000 | Ezure et al. | ................ | 430/533 |
| 6,232,054 B1 | * 5/2001 | Okutu et al. | ................ | 430/533 |

FOREIGN PATENT DOCUMENTS

| | | |
|---|---|---|
| JP | 10-293381 | 11/1998 |
| JP | 11-202445 | 7/1999 |
| JP | 11-202446 | 7/1999 |

OTHER PUBLICATIONS

Derwent 1999–030310, Abst of JP 10/293 381, Nov. 1998.*

American National Standard for Photography (Film) –Methods for Determining Curl, ANSI/ASC PH1.29–1985, 14 pages.

* cited by examiner

*Primary Examiner*—Richard L. Schilling
(74) *Attorney, Agent, or Firm*—Sughrue Mion, PLLC

(57) ABSTRACT

Disclosed are a polyester support excellent in cutting properties in a photofinishing laboratory, which has both transverse direction (TD) and machine direction (MD) breaking strengths of from 5 kg/mm$^2$ to 18 kg/mm$^2$, and both TD and MD breaking elongations of from 20% to 140%, and a silver halide photographic material using the support.

14 Claims, 1 Drawing Sheet

POLYESTER SUPPORT AND SILVER HALIDE PHOTOGRAPHIC MATERIAL

FIELD OF THE INVENTION

The present invention relates to a polyester support excellent in cutting properties (film cutting and notch forming properties) in a photofinishing laboratory (processing laboratory), excellent in handling properties, and less generation of develop scratches. Further, the present invention relates to a silver halide photographic material using the same.

BACKGROUND OF THE INVENTION

Silver halide photographic materials (hereinafter also briefly referred to as photographic materials) using polyester supports are described in JP-A-6-035118 (the term "JP-A" as used herein means an "unexamined published Japanese patent application"). However, when these photographic materials were used to prepare brownie or 135 system photographic materials and subject them to a sequence of processing steps in a photofinishing laboratory (processing laboratory), poor cutting occurred in cutters mounted on a miniature laboratory, a splicer and a mounter for reversal. The reason for this is that the polyester supports high in mechanical strength and poor in cutting properties are difficult to be cut, because TAC supports that have previously been used are very easy to be cut and the cutters are adjusted thereto.

For solving this problem, anisotropic stretching (twice or less in a machine direction (MD) and 2.5 to 6 times in a transverse direction (TD)) as described in JP-A-10-293381 is proposed. However, when photographic materials using supports obtained by such anisotropic stretching were allowed to pass through a sequence of processing steps in a processing laboratory, poor cutting occurred in a notch forming step. The term "notch" as used herein means a half-round opening having a diameter of 3 to 8 mm formed for recognizing a position of an image in a printer. In the anisotropic supports prepared in the above-mentioned patent, isotropic half-round openings can not be formed precisely. It has been therefore desired that such disadvantage is overcome.

Further, a method of mixing polyesters different from each other in intrinsic viscosity as described in JP-A-11-202446 is proposed. According to this method, however, not only the load in cutting and notch forming is heavy, but also flashes (remainders remaining at cut portions without being cut away) are generated in large amounts. Such disadvantage has therefore been desired to be overcome. Furthermore, the use of a polyester low in intrinsic viscosity, that is to say, low in molecular weight, is liable to produce scratches during development and printing under a low-moisture atmosphere in a processing laboratory. It has been therefore desired that such problem is solved.

SUMMARY OF THE INVENITON

An object of the present invention is to provide a polyester support excellent in cutting properties (film cutting and notch forming properties) in a photofinishing laboratory (processing laboratory), excellent in handling properties, and difficult to generate scratches.

Another object of the present invention is to provide a silver halide photographic material using such a polyester support.

These objects have been attained by a polyester support having both transverse direction (TD) and machine direction (MD) breaking strengths of from 5 kg/mm$^2$ to 18 kg/mm$^2$, and both transverse direction (TD) and machine direction (MD) breaking elongations of from 20% to 140%.

Further, these objects have also been attained by a polyester support having both transverse direction (TD) and machine direction (MD) breaking strengths of from 5 kg/mm$^2$ to 18 kg /mm$^2$, and both TD and MD Young's moduli of from 400 kg /mm$^2$ to 650 kg /mm$^2$.

EXPLANATION OF SYMBOL

Figure 1:
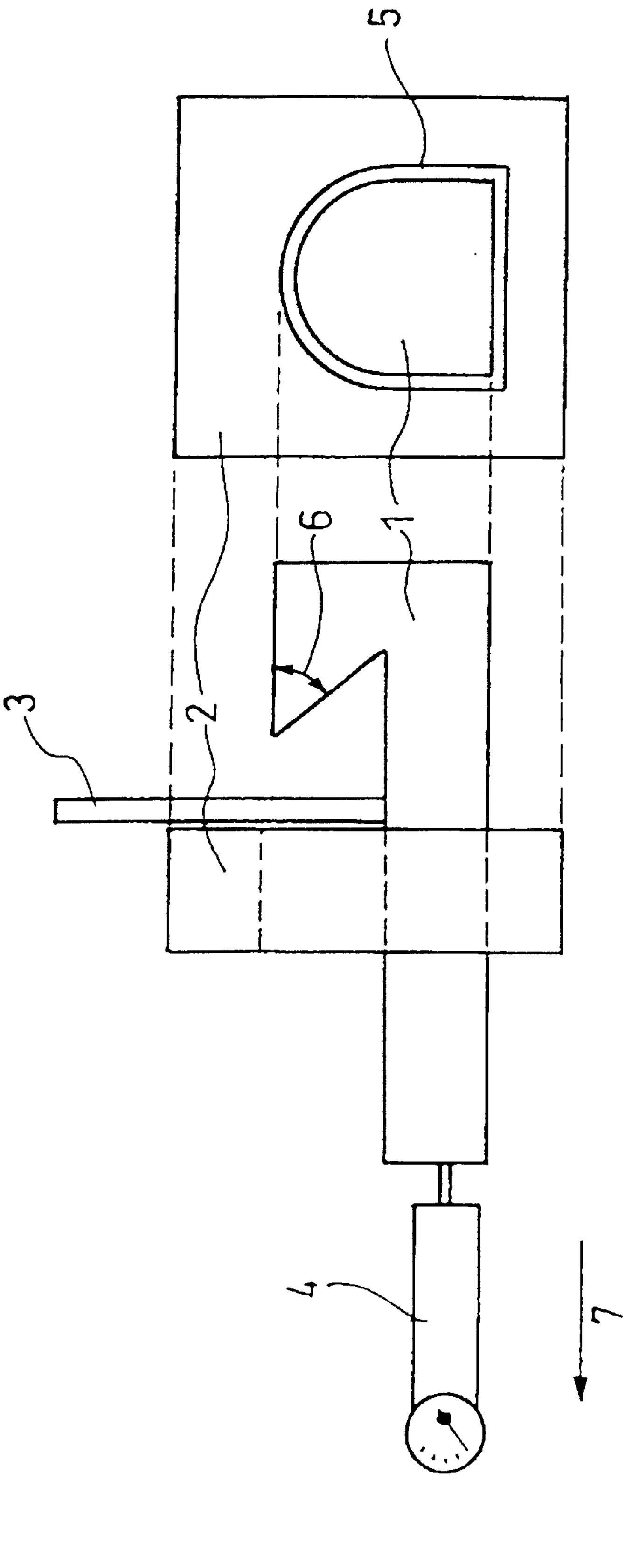
FIG. 1 is schematic views illustrating a method for measuring the notch forming strength in the present invention (left: a side view and right: a front view).

1: Convex blade (diameter: 5.5 mm)
2: Concave blade
3: Sample film
4: Tension meter
5: Clearance between convex blade and concave blade
6: Angle (60 degrees)
7: Pulled direction

DETAILED DESCRIPTION OF THE INVENTION

In the polyester support of the present invention, both the transverse direction (TD) and machine direction (MD) breaking strengths are preferably from 5 kg/mm$^2$ to 18 kg/mm$^2$, more preferably form 7 kg/mm$^2$ to 16 kg/mm$^2$, and still more preferably from 8 kg/mm$^2$ to 14 kg/mm$^2$, and both the TD and MD breaking elongations are preferably from 20% to 140%, more preferably from 30% to 120%, and still more preferably from 40% to 100%.

Further, both the TD and MD Young's moduli are preferably from 400 kg/mm$^2$ to 650 kg/mm$^2$, more preferably from 450 kg/mm$^2$ to 630 kg/mm$^2$, and still more preferably from 500 kg/mm$^2$ to 600 kg/mm$^2$.

Still further, in the polyester support of the present invention, the TD and MD notch forming strengths are preferably from 300 g to 2100 g, more preferably from 500 g to 1800 g, and still more preferably from 700 g to 1600 g.

Furthermore, the notch forming strength ratio (TD/MD) is preferably from 0.6 to 1.5, more preferably from 0.7 to 1.4, still more preferably from 0.8 to 1.3, and most preferably from 0.8 to 1.2.

Further, the breaking strength ratio (TD/MD) is preferably from 0.6 to 1.5, more preferably from 0.7 to 1.4, still more preferably from 0.8 to 1.2, and most preferably from 0.8 to 1.2.

Further, the young's modulus ratio (TD/MD) and the breaking elongation ratio (TD/MD) are preferably from 0.6 to 1.5, more preferably from 0.7 to 1.4, still more preferably from 0.8 to 1.3, and most preferably from 0.8 to 1.2.

Further, the orientation angle at both edges is preferably from 0 degree to 40 degrees, more preferably from 0 degree to 35 degrees, and more preferably from 0 degree to 30 degrees.

The thickness unevenness in TD is preferably from 0 $\mu$m to 8 $\mu$m, more preferably from 0 $\mu$m to 7 $\mu$m, and still more preferably from 0 $\mu$m to 6 $\mu$m. The thickness unevenness in MD is preferably from 0 $\mu$m to 8 $\mu$m, more preferably from 0 $\mu$m to 7 $\mu$m, and still more preferably from 0 $\mu$m to 6 $\mu$m.

The thickness of the polyester support is preferably from 70 μm to 200 μm, more preferably from 80 μm to 150 μm, and still more preferably from 90 μm to 130 μm.

The total light transmittance of the polyester support of the present invention is preferably from 70% to 98%, more preferably from 80% to 96%, and still more preferably from 86% to 95%. The haze thereof is preferably from 0% to 2%, more preferably from 0% to 1.5%, and still more preferably from 0% to 1%.

The coefficient of heat shrinkage (the rate of change in dimension) at 100° C. for 24 hours is preferably from 0% to 0.3%, more preferably from 0% to 0.25%, and still more preferably from 0% to 0.2%.

In the polyester support of the present invention, the amount of heat of an endothermic peak appearing at a temperature of 100° C. to 170° C. is preferably from 0.3 J/g to 5 J/g, more preferably from 0.4 J/g to 5 J/g, and still more preferably from 0.8 J/g to 3 J/g.

Further, at least one light-sensitive layer is provided on such a support to prepare a silver halide photographic material, and the gutter-shaped curl (which is referred as "W-curl" in FIG. 1 of American National Standard (ANSI/ASC PH 1.29-1985)) is preferably from 20 $m^{-1}$ to 55 $m^{-1}$, more preferably from 20 $m^{-1}$ to 48 $m^{-1}$, and still more preferably from 20 $m^{-1}$ to 42 $m^{-1}$. Furthermore, the curl given by winding is preferably from 30 $m^{-1}$ to 140 $m^{-1}$, more preferably from 40 $m^{-1}$ to 120 $m^{-1}$, and still more preferably from 50 $m^{-1}$ to 110 $m^{-1}$.

The compositions and film formation methods of such supports are as follows.

The polyesters are formed from dicarboxylic acids and diols, and the dicarboxylic acid residues preferably contain naphthalenedicarboxylic acid residues. The amount of naphthalenedicarboxylic acid residues contained in the total dicarboxylic acid residues is preferably from 50 mol % to 100 mol %, more preferably from 60 mol % to 97 mol %, and still more preferably from 75 mol % to 95 mol %. Examples of the naphthalenedicarboxylic acids include 2,6-, 1,5-, 1,4- and 2,7-naphthalenedicarboxylic acids, and preferred is 2,6-naphthalenedicarboxylic acid.

The amount of ethylene glycol residues contained in the total diol residues is preferably from 50 mol % to 100 mol %, more preferably from 60 mol % to 97 mol %, and still more preferably from 75 mol % to 95 mol %.

Preferred copolymerizable dicarboxylic acid residues other than the naphthalenedicarboxylic acid residues include the following:

(1) Straight-chain, branched or cyclic aliphatic dicarboxylic acid residues each having from 3 to 30 carbon atoms, preferably from 4 to 20 carbon atoms, and more preferably from 5 to 10 carbon atoms Specific examples thereof include the following:

$HOOC-(CH_2)_2-COOH$ $HOOC-(CH_2)_4-COOH$ $HOOC-(CH_2)_8-COOH$ $HOOC-(CH_2)_{18}-COOH$

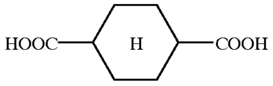

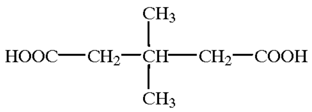

-continued

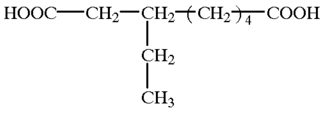

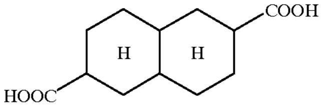

(2) Aromatic dicarboxylic acid residues each having from 3 to 30 carbon atoms

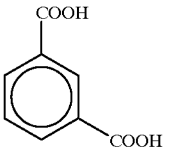
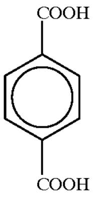
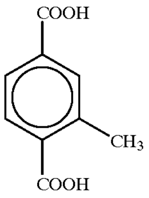

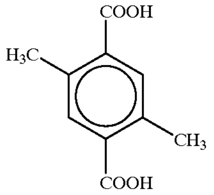
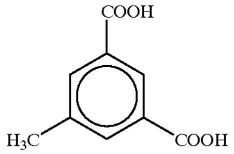

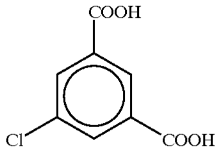
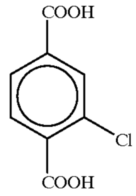

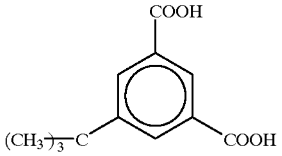

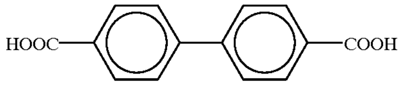

Preferred diol residues other than the ethylene glycol residues include the following:

(1) $H-O-[(CH_2)_n-O]_m-H$ residues (n=an integer of from 2 to 6 and m=an integer of from 2 to 30, and more preferably n=an integer of from 2 to 6 and m=an integer of from 2 to 20)

$H-O-[(CH_2)_2-O]_5-H$ $H-O-[(CH_2)_2-O]_8-H$ $H-O-[(CH_2)_2-O]_{30}-H$ $H-O-[(CH_2)_4-O]_2-H$ $H-O-[(CH_2)_4-O]_8-H$ $H-O-[(CH_2)_4-O]_{15}-H$ $H-O-[(CH_2)_6-O]_3-H$ $H-O-[(CH_2)_6-O]_{12}-H$ $H-O-[(CH_2)_6-O]_{25}-H$ (2) $H-(OCH_2CH_2)_n-O-B-R-B-O-(CH_2CH_2O)_m-H$ residues (n=an integer of from 1 to 3, m=an integer of from 1 to 3, n and m may be the same or different, R represents —O—, —S—, —$CH_2$—or —$C(CH_3)_2$—, and B represents a benzene ring)

Specific examples thereof include the following structures:

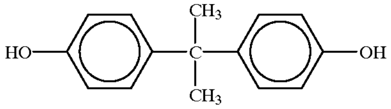

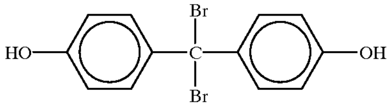

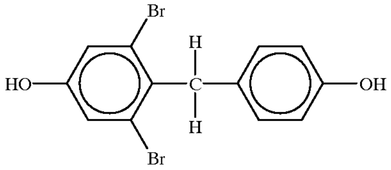

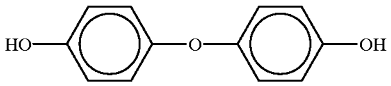

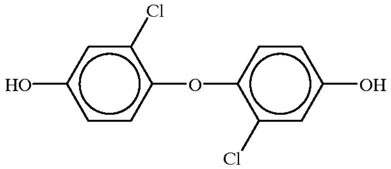

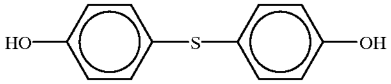

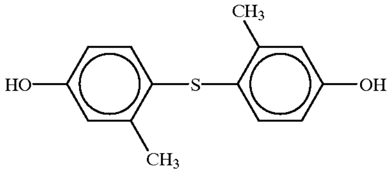

(3) Straight-chain, cyclic or branched diol residues each having from 3 to 30 carbon atoms Straight-chain, cyclic or branched diol residues each having from 3 to 30 carbon atoms, preferably from 3 to 12 carbon atoms are preferred. More preferred examples of the polymerizable diol components include trimethylene glycol (TMG), neopentyl glycol (NPG), hexamethylene glycol (HMG), cyclohexane dimethanol (CHDM) and H—O—$[(CH_2)_n—O]_m$—H (n=an integer of from 3 to 6 and m=an integer of from 2 to 8).

Besides the diols and the dicarboxylic acids, hydroxycarboxylic acids may be used. Examples thereof include p-hydroxybenzoic acid (PHBA) and 6-hydroxy-2-naphthalene-carboxylic acid (HNCA), and PHBA is particularly preferred. It is also preferred that they are polymerized as diol-adducts (for example, ethoxy-adducts).

The intrinsic viscosity of these polymers is preferably from 0.2 to 0.8, more preferably from 0.30 to 0.65, and still more preferably from 0.35 to 0.50. When the PEN homopolymer is used alone, the intrinsic viscosity thereof is preferably from 0.36 to 0.53, more preferably from 0.40 to 0.51, and still more preferably from 0.43 to 0.50.

The Tg (i.e., glass transition temperature) of blends of these polymers (homopolymers, copolymers, blends of different kinds or the same kind of polymers, or blends of polymers different in viscosity) is preferably from 85° C. to 150° C., more preferably from 95° C. to 145° C., and still more preferably from 105° C. to 140° C.

Such polyesters are produced by heating dicarboxylic diesters (usually dimethyl esters) and diols of starting materials at a temperature of from 150° C. to 250° C. at atmospheric pressure in the presence of ester interchange reaction catalysts, allowing them to react with each other for 0.5 hour to 5 hours while removing methanol, a by-product, by distillation, and gradually raising the degree of vacuum from atmospheric pressure to 0.3 torr to polycondense them with stirring. The polyesters of the present invention different in intrinsic viscosity can be obtained by changing the polycondensation time. Further, the current quantity of a stirring torque motor increases as the viscosity of the polymers increases with an increase in their polymerization degree. From this fact, the viscosity can be measured from calibration curves previously prepared. These polyesters can be synthesized with reference to descriptions of Kobunshi Jikkengaku (Polymer Experiments) "Polycondensation and Polyaddition", pages 103 to 136 (Kyoritsu Shuppan, 1980) and "Synthetic Polymers V", pages 187 to 286 (Asakura Shoten, 1971), JP-A-5-163337, JP-A-3-179052, JP-A-2-3420 and JP-A-1-275628. The polyesters thus polymerized are taken out, cooled with water, and solidified in the noodle form, followed by cutting to pellets.

Specific examples of the polyesters used in the present invention include but are not limited to the following polymers:

(1) Example of Homopolymer

HP-1: Polyethylene-2,6-naphthalate (PEN) Tg=120° C., (2) Examples of Copolymers

| | | Tg (° C.) | Composition (molar ratio) |
|---|---|---|---|
| CP-1: | 2,6-NDCA/TPA/EG | 105 | (80/20/100) |
| CP-2: | 2,6-NDCA/IPA/EG | 100 | (80/20/100) |
| CP-3: | 2,6-NDCA/AA/EG/BPA.2EO | 115 | (95/5/90/10) |
| CP-4: | 2,6-NDCA/AA/EG/BPA.2EO | 95 | (80/20/90/10) |
| CP-5: | 2,6-NDCA/TPA/EG/NPG | 110 | (90/10/90/10) |
| CP-6: | 2,6-NDCA/IPA/EG/BPA.2EO | 90 | (90/10/90/10) |
| CP-7: | 2,6-NDCA/IPA/EG/HMG | 105 | (90/10/95/5) |
| CP-8: | 2,6-NDCA/AA/EG | 110 | (95/5/100) |
| CP-9: | 2,6-NDCA/AA/EG | 95 | (80/20/100) |
| CP-10: | 2,6-NDCA/AA/EG | 90 | (70/30/100) |
| CP-11: | 2,6-NDCA/AA/$HO(CH_2CH_2O)_{80}H$/EG | 90 | (90/10/10/90) |
| CP-12: | 2,6-NDCA/TPA/EG | 85 | (80/20/100) |
| CP-13: | 2,6-NDCA/TPA/EG/BPA.2EO | 80 | (50/50/75/25) |
| CP-14: | 2,6-NDCA/EG/BPA.2EO | 145 | (100/25/75) |
| CP-15: | 2,6-NDCA/EG/CHDM/BPA.2EO | 135 | (100/25/25/50) |
| CP-16: | 2,6-NDCA/AA/EG/CHDM | 125 | (90/10/90/10) |
| CP-17: | 2,6-NDCA/EG/CHDM | 130 | (100/80/20) |
| CP-18: | 2,6-NDCA/IPA/$HO(CH_2CH_2O)_{80}H$/EG | 105 | (95/5/10/90) |
| CP-19: | 2,6-NDCA/ $HO(CH_2CH_2CH_2O)_{160}H$/EG | 90 | (100/15/85) |
| CP-20: | 2,6-NDCA/ $HO(CH_2CH_2O)_{20}H$/EG | 105 | (100/20/80) |
| CP-21: | 2,6-NDCA/PHBA/EG | 125 | (100/10/100) |
| CP-22: | 2,6-NDCA/PHBA/EG | 130 | (100/20/100) |
| CP-23: | 2,6-NDCA/EG/BPA.2EO | 135 | (100/80/20) |
| CP-24: | 2,6-NDCA/EG/BPA.2EO | 130 | (100/90/10) |
| CP-25: | 2,6-NDCA/EG/CHDM | 125 | (100/90/10) |
| CP-26: | 2,6-NDCA/EG/CHDM | 122 | (100/95/5) |
| CP-27: | 2,6-NDCA/SA/EG | 110 | (95/5/100) |
| CP-28: | 2,6-NDCA/SA/EG | 95 | (80/20/100) |
| CP-29: | 2,6-NDCA/SA/EG | 90 | (70/30/100) |

(wherein NDCA indicates naphthalenedicarboxylic acid, TPA indicates terephthalic acid, IPA indicates isophthalic acid, AA indicates adipic acid, SA indicates sebacic acid, BPA·2EO indicates ethylene oxide addition product of bisphenol A, NPG indicates neopentyl glycol, HMG indicates hexamethylene glycol, CHDM indicates cyclohexanedimethanol, EG indicates ethylene glycol, and PHBA indicates p-hydroxybenzoic acid.)

(3) Examples of Polymer Blends

| | Tg (° C.) | Composition (wt ratio) |
|---|---|---|
| PB-1: PEN/PET | 105 | (80/20) |
| PB-2: PEN/CP-4 | 110 | (70/30) |
| PB-3: PEN/CP-8 | 115 | (90/10) |
| PB-4: PEN/CP-15 | 125 | (85/15) |
| PB-5: PAr/PEN | 150 | (15/85) |
| PB-6: PAr/PCT/PEN | 140 | (15/10/75) |
| PB-7: PAr/PC/PEN | 135 | (10/10/80) |

(wherein PEN indicates polyethylene naphthalate, PET indicates polyethylene terephthalate, PAr indicates polyarylate, and PCT indicates polycyclohexanedimethanol terephthalate.)

In the present invention, these polyesters different in intrinsic viscosity may be used as a mixture of two or more of them. The preferred difference in intrinsic viscosity is from 0.1 to 0.6, preferably from 0.1 to 0.5, more preferably from 0.15 to 0.4, and still more preferably from 0.2 to 0.35.

Although these polyesters may be the same or different, it is preferred that at least one is PEN. More preferably, both are PEN.

The intrinsic viscosity of the polyester higher in the viscosity is preferably from 0.3 to 0.8, more preferably from 0.35 to 0.7, and still more preferably from 0.40 to 0.62. The intrinsic viscosity of the polyester lower in the viscosity is preferably from 0.2 to 0.6, more preferably from 0.25 to 0.56, and still more preferably from 0.30 to 0.52.

The content (weight ratio) of the polyester lower in the viscosity is preferably from 5% to 45%, more preferably from 10% to 40%, and still more preferably from 15% to 35%.

Further, it is more preferred that dyes or fillers are added to the polyesters of the present invention during or after polymerization. As the dyes, heat-decomposable anthraquinone dyes are preferably used, and examples thereof include dyes described in JP-A-8-122970. The dyes are preferably added in such a concentration that a film formed to a thickness of 100 $\mu$m is decreased in permeability at 400 nm to 700 nm by 1% to 10%. The fillers may be either fine organic particles or fine inorganic particles. However, from the viewpoint of heat resistance, the fine inorganic particles are preferred, and examples thereof include silica, alumina, calcium carbonate, barium sulfate, titania and mica. The particle size thereof is preferably from 0.1 $\mu$m to 2 $\mu$m, and the form thereof may be any of amorphous, tabular and spherical forms. Further, two or more kinds of particles may be used as a mixture. The particles are added in an amount of from 10 ppm to 300 ppm.

Methods for forming films for these polyester supports will be described below.

In the present invention, the film formation methods have the following characteristics:

(1) The MD and TD stretching is conducted in the order of the first MD stretching, the first TD stretching, the second MD stretching and the second TD stretching at a total MD stretching ratio (a first MD stretching ratio×a second MD stretching ratio)/a total TD stretching ratio (a first TD stretching ratio×a second TD stretching ratio) of from 0.7 to 1.5. The film is stretched approximately uniformly in the MD and the TD.

(2) Heat setting is carried out in multiple stages, and the heat setting temperature in a later stage is established to become lower than that in a former stage.

(3) After the heat setting, the film is quenched giving a temperatures difference to the front and the back thereof (anisotropic quenching).

This makes it possible to prepare the polyester supports excellent in cutting properties (film cutting and notch forming properties) over the whole areas in both the MD and the TD and to hardly generate scratches. Details of these film formation methods will be described below.

(1) Melting and Extrusion

The polymer polymerized by the above-mentioned method is palletized and dried at 80° C. to 200° C. for at least 1 hour. Then, the polymer is melted at a melting point thereof, 250° C. to 320° C. A single or multiple screw kneading extruder is used for melting. In the present invention, it is preferred that two or more extruders are used by combining them in tandem. More preferably, two single screw extruders are combined in tandem. Then, it is preferred that the melted polymer is previously filtered through a filter. The filters include wire cloth, sintered wire cloth, sintered metal, sand and glass fiber. The melted polymer thus filtered is melt-extruded through a T die to form an unstretched film. When two or more kinds of polymers are blended, an ordinary multiple screw kneading extruder is preferably used.

The melted polymer extruded from the T die is introduced onto a casting drum adjusted to a temperature of from 25° C. to 100° C. At this time, it is also preferred that the adhesion to the drum is improved by the electrostatic application method or the liquid film formation method (the method of applying a fluid such as water onto the casting drum to improve the adhesion of the melt to the drum) to improve the flat surface property. The melt is separated from the drum to form an unstretched sheet.

(2) MD Stretching

The unstretched sheet is stretched in the machine direction (MD). In this case, the sheet is preferably stretched in two divided steps, and more preferably stretched in the order of the first MD stretching, the first TD stretching, the second MD stretching and the second TD stretching. The total stretching ratio (the first stretching ratio×the second stretching ratio) is preferably from 2.0 times to 4.5 times, more preferably from 2.2 times to 4.2 times, and still more preferably from 2.5 times to 3.8 times.

The stretching temperature is preferably from 90° C. to 160° C., more preferably from 105° C. to 150° C., and still more preferably from 120° C. to 140° C.

The MD stretching speed is preferably from 10%/second to 300%/second, more preferably from 30%/second to 250%/second, and still more preferably from 50%/second to 200%/second.

The first MD stretching can be carried out by transferring the unstretched sheet between a pair of rolls different from each other in peripheral speed. The stretching speed and the stretching ratio can be changed by adjusting the roll revolutions. The stretching temperature can be changed by adjusting a heat drum or a radiant-type heater (e.g. , an infrared lamp or a halogen lamp).

The second MD stretching can be conducted by gradually increasing the transfer speed of chucks in a tenter to widen the distance in the MD between the chucks. The stretching temperature can be varied by changing the temperature of hot air blown into the tenter.

(3) TD Stretching

The TD stretching is preferably carried out in two divided steps, the first TD stretching and the second TD stretching.

The total stretching ratio (the first MD stretching ratio×the second TD stretching ratio) is preferably from 2.0 times to 4.5 times, more preferably from 2.2 times to 4.2 times, and still more preferably from 2.5 times to 3.8 times.

The MD stretching/TD stretching ratio (the total MD stretching ratio/the total TD stretching ratio) is preferably from 0.7 to 1.5, more preferably from 0.8 to 1. 4, and still more preferably from 0.9 to less than 1.2.

The TD stretching temperature is preferably from 100° C. to 160° C., more preferably from 110° C. to 150° C., and still more preferably from 120° C. to 140° C.

The stretching speed of the TD stretching is preferably from 10%/second to 300%/second, more preferably from 30%/second to 250%/second, and still more preferably from 50%/second to 200%/second.

Both the first stretching and the second stretching can be achieved by gripping both edges of the film with chucks and widening the width of the film in a tenter. The stretching speed can be varied by changing the length of a stretching zone or the transfer speed of the chucks.

(4) Heat Setting

It is preferred that the heat setting is conducted in two to ten divided steps. The heat setting temperature is preferably from 150° C. to 260° C., more preferably from 165° C. to 240° C., and still more preferably from 180° C. to 220° C. The treating time is preferably from 5 seconds to 180 seconds, more preferably from 10 seconds to 120 seconds, and still more preferably from 15 seconds to 60 seconds. In this case, the heat setting temperature in a later stage is preferably established to become lower than that in a former stage. The difference in temperature is preferably from 2° C. to 30° C., more preferably from 3° C. to 25° C., still more preferably from 4° C. to 20° C.

It is preferred that the film is relaxed by 0% to 10% in the transverse direction during the heat setting. The relaxation is more preferably from 0% to 8%, and still more preferably from 0% to 6%. The film is also preferably relaxed in two or more divided steps.

Such heat setting and relaxation can be achieved by chucking both edges of the film, transferring the film into a heat-setting zone, and narrowing the width thereof. In this case, the multiple-stage heat setting can be attained by passing the film through a plurality of heat setting zones changed in temperature.

(4) Cooling and Winding

After the heat setting, cooling is conducted. The point of the present invention is in that the formed film is quenched giving a temperature difference to the front and the back thereof. Scratches produced during handling, which are one problem to be solved in the present invention, are caused by a gutter-shaped curl generated by the contraction of the light-sensitive layer side at low humidity. For solving this problem, the mechanical strength of the support film, particularly the modulus of elasticity thereof, is raised to overcome the contraction stress of the light-sensitive layer, thereby being able to decrease the gutter-shaped curl. However, such a support is difficult to be cut, and incompatible with the easy-cutting properties, which is the other problem to be solved in the present invention. Then, in the present invention, the gutter-shaped curl is previously formed in the film by an anisotropic quenching method as described below, and compensated with the gutter-shaped curl due to the contraction of the light-sensitive layer, thereby allowing the prevention of the scratches to be compatible with the easy-cutting properties.

In the anisotropic quenching of the present invention, the temperature of one face of the formed film is established to be 10° C. to 50° C. higher, preferably 15° C. to 40° C. higher, and more preferably 17° C. to 30° C. higher than the temperature of the opposite face thereof between the heat setting and winding. Further, the film sent out of an outlet of the heating zone is quenched to room temperature for a cooling time of from 3 seconds to 40 seconds, preferably from 5 seconds to 30 seconds, and more preferably from 7 seconds to 20 seconds, which can form the gutter-shaped curl with the face of the lower temperature side positioned inside. Accordingly, application of the light-sensitive layer onto the face of the higher temperature side can compensate the gutter-shaped curl generated by the contraction of the light-sensitive layer at low humidity with the gutter-shaped curl previously formed.

Such anisotropic quenching may be conducted by supplying currents of air different from each other in temperature from air ducts, respectively, provided above and below the formed film, or passing the film between a pair of upper and lower temperature-controlled rolls different from each other in temperature, or bringing one face of the film into contact with a temperature-controlled roll and supplying a current of temperature-controlled air to the opposite side.

After quenched, the film is trimmed and wound on a roll. At this time, it is also preferred that edges of the support are subjected to knurling. The width of the film is preferably from 0.5 m to 10 m, more preferably from 0.8 m to 8 m, and still more preferably from 1 m to 6 m. The thickness thereof is preferably from 90 $\mu$m to 150 $\mu$m, more preferably from 100 $\mu$m to 140 $\mu$m, and still more preferably from 100 $\mu$m to 130 $\mu$m.

The support thus formed is heat treated preferably at a temperature of from 50° C. to Tg, more preferably at a temperature of from 70° C. to Tg, and still more preferably at a temperature of from 75° C. to Tg (hereinafter also briefly referred to as BTA treatment). The heat treatment time is preferably from 1 hour to 500 hours, more preferably from 3 hours to 200 hours, and still more preferably from 5 hours to 100 hours.

Such BTA treatment may be conducted at a constant temperature (constant temperature BTA method), or subjected to gradual cooling with from a temperature of Tg or higher (gradual cooling BTA method). The average cooling speed of the latter is preferably from −0.001° C./minute to −100° C./minute, more preferably from −0. 001° C./minute to −10° C./minute, and still more preferably from −0.001° C./minute to −1° C./minute. It is also preferred that these methods are combined with each other.

As a result, an endothermic peak having a maximum value at 100° C. to 170° C. can be obtained. The quantity of heat of the endothermic peak is preferably from 0.5 J/g to 5 J/g, more preferably from 0.8 J/g to 4 J/g, and still more preferably from 0.8 J/g to 2.5 J/g.

It is also preferred that such heat treatment is conducted to the support after the film formation, after the following surface treatment, or after formation of a conductive layer, an undercoat layer or a back layer.

Although the light-sensitive layer and the back layer are provide on the polyester support thus prepared, the support is preferably surface treated before the formation of the layers for securing the adhesion of the layers to the support. Examples of the surface treatment processes include chemical treatment, mechanical treatment, corona treatment, flame treatment, ultraviolet treatment, high frequency treatment, glow treatment, active plasma treatment, laser treatment, mixed acid treatment and ozone oxidation treatment. Of these, corona treatment, ultraviolet treatment, glow treatment and flame treatment are particularly effective, and glow treatment is more effective. These can be performed by methods described in JIII Journal of Technical Disclosure No. 94-6023, Japan Institute of Invention and Innovation.

It is preferred that an antistatic layer is provided on the support of the present invention. There is no particular limitation on an antistatic agent used in such an antistatic layer, and it may be either a conductive antistatic agent or a compound having a static charge series adjusting function.

The conductive antistatic agents include metal oxides and ionic compounds. The conductive antistatic agents preferably used in the present invention are conductive metal oxides not inactivated in antistatic properties after development processing and derivatives thereof, conductive metals, carbon fiber and n conjugate polymers (such as polyarylenevinylenes) Of these the conductive materials particularly preferably used are crystalline metal oxide particles.

The most preferred examples of the conductive metal oxide particles include fine particles of at least one crystalline metal oxide selected from ZnO, $TiO_2$, $SnO_2$, $Al_2O_3$, $In_2O_3$, $SiO_2$, MgO, BaO, $MoO_3$ and $V_2O_5$, or composite oxides thereof. Of these, conductive materials containing $SnO_2$ as a main component, about 5% to about 20% of antimony oxide and/or another component (such as silicon oxide, boron or phosphor) are particularly preferred. The volume resistivity of the particles of these conductive crystalline oxides or the composite oxides thereof is $10^7$ Ωcm or less, preferably $10^6$ Ωcm or less, and more preferably $10^5$ Ωcm or less.

Details of these conductive materials and coating methods thereof are described in JIII Journal of Technical Disclosure No. 94-6023, Japan Institute of Invention and Innovation. The conductive materials can be applied to the supports according to them.

The formation of such a conductive layer is preferably conducted after the surface treatment described above, form the viewpoint of improvement in the adhesion of the layer to the support.

Then, undercoat layers provided between the surface—treated supports and the light-sensitive layers will be described. As processes for forming the undercoat layers, there are a so-called multilayer coating process in which a layer highly adhesive to the support (hereinafter briefly referred to as a first undercoat layer) is provided as a first layer, and then a layer well adhesive to the first layer and a photographic layer is provided thereon as a second layer, and a so-called single-layer process in which only one layer well adhesive to the support and a photographic layer (hereinafter briefly referred to as a second undercoat layer) is provided.

In the first undercoat layer in the multilayer process, for example, a copolymer using as a starting material a monomer selected from vinyl chloride, vinylidene chloride, butadiene, vinyl acetate, styrene, acrylonitrile, methacrylate esters, methacrylic acid, acrylic acid, itaconic acid and maleic anhydride, an epoxy resin, gelatin, nitrocellulose or polyvinyl acetate is used. In the second undercoat layer, gelatin is mainly used.

In the single-layer process, the support is allowed to swell, and interface mixed with an undercoat polymer to obtain good adhesive quantity, in many cases. Examples of the undercoat polymers used herein include water-soluble polymers such as gelatin, gelatin derivatives, casein, agar, sodium alginate, starch, polyvinyl alcohol, polyacrylic copolymers and maleic anhydride copolymers, cellulose esters such as carboxymethyl cellulose and hydroxyethyl cellulose, and latex polymers such as vinyl chloride-containing copolymers, vinylidene chloride-containing copolymers, acrylic ester-containing copolymers and vinyl acetate-containing copolymers. Of these, preferred is gelatin. Any gelatin generally used in the art, such as lime-treated gelatin, acid-treated gelatin, enzyme-treated gelatin, gelatin derivatives or modified gelatin, can be used. of these, most preferably used are lime-treated gelatin and acid-treated gelatin.

The undercoat polymers can be hardened. Examples of the hardeners include, for example, chromium salts (such as chrome alum), aldehydes (such as formaldehyde and glutaraldehyde), epoxy compounds, isocyanates, active halogen compounds (such as 2,4-dichloro-6-hydroxy-s-triazine, epichlorohydrin resins, polyamide-epichlorohydrin resins, and cyanuric chloride compounds), vinyl sulfone or sulfonyl compounds, carbamoyl-ammonium salt compounds, amidinium salt compounds, carbodiimide compounds and pyridinium salt compounds.

The undercoat layers of the present invention may contain various kinds of additives as needed. For example, such additives include surfactants, antistatic agents, antihalation agents, dyes for coloring, pigments, coating aids and antifoggants.

Further, the undercoat layers of the present invention may contain fine inorganic or organic particles as matting agents to such an extent that the transparency and granularity of images are not substantially impaired. As the matting agents of the fine inorganic particles, silica ($SiO_2$), titanium oxide ($TiO_2$), calcium carbonate and magnesium carbonate can be used. Examples of the matting agents of the fine organic particles that can be used include polymethyl methacrylate, cellulose acetate propionate, polystyrene, materials soluble in processing solutions described in U.S. Pat. No. 4,142,894, and polymers described in U.S. Pat. No. 4,396,706. The average particle size of these fine particle matting agents is preferably from 0.01 μm to 10 μm, and more preferably from 0.05 μm to 5 μm. Further, the content thereof is preferably from 0.5 $mg/m^2$ to 600 $mg/m^2$, and more preferably from 1 $mg/m^2$ to 400 $mg/m^2$.

Compounds used for swelling the supports used in the present invention include resorcin, chlororesorcin, o-cresol, m-cresol, p-cresol, phenol, o-chlorophenol, p-chlorophenol, dichlorophenol, trichlorophenol, monochloroacetic acid, dichloroacetic acid, trifluoroacetic acid and chloral hydrate. Of these, preferred are resorcin and p-chlorophenol.

Details of these undercoat materials are described in JIII Journal of Technical Disclosure No. 94-6023, Japan Institute of Invention and Innovation, and the undercoat materials can be used according thereto.

These undercoat solutions can be applied by generally well-know coating methods such as dip coating, air knife coating, curtain coating, roller coating, wire bar coating, gravure coating and extrusion coating using a hopper described in U.S. Pat. No. 2,681,294. Further, two or more layers can be formed at the same time by methods described in U.S. Pat. Nos. 2,761,791, 3,508,947, 2,941,898 and 3,526,528, and Yuji Harazaki, *Coating Kogaku* (Coating Engineering) page 253 (published by Asakura Shoten, 1973), as needed.

It is preferred that such undercoat layers are formed after the heat treatment of the present invention. These undercoat layers are layers for imparting adhesive quality, so that many of them have stickiness. As a result, the formation of the undercoat layers before the heat treatment is unfavorable because blocking is liable to occur.

The photographic material of the present invention may have either light-sensitive silver halide emulsion layers on both faces of the support, or the emulsion layer on only one face thereof. When the support has the emulsion layer on one face thereof, it is preferred that the back layer is provided on the opposite side of the support. The back layer generally has a plurality of constituting layers for exhibiting various functions. Examples of such layers include an adhesion layer, an antistatic layer, a scratch resistant layer, a lubricating layer, a stick-preventing layer and a curl-preventing layer. A transparent magnetic recording layer as described in U.S. Pat. Nos. 3,782,947 and 4,279,945 may further be provided.

There is no particular limitation on the constituting order of these layers and the thickness thereof, and two or more layers having the same function may be formed according to circumstances. The thickness of each layer is preferably from 0.0001 $\mu$m to 10 $\mu$m, more preferably from 0.001 $\mu$m to 5 $\mu$m. The total thickness of the layers is preferably from 0.001 $\mu$m to 10 $\mu$m.

Although the constituting layer on the back side may be formed of only a material having each function, it is generally used together with a binder. The binder may be a hydrophobic polymer, a hydrophilic polymer as used for an underlayer, or crosslinked polymer as a latex.

The antistatic layer being one function of the back layer, can be provided by the above-mentioned methods.

When the lubricating layer (i.e., the sliding layer) is given, lubricants (i.e., sliding agents) used include, for example, polyorganosiloxanes as disclosed in JP-B-53-292 (the term "JP-B" as used herein means an "examined Japanese patent publication"), higher fatty acid amides as disclosed in U.S. Pat. No. 4,275,146, higher fatty acid esters (esters of fatty acids each having from 10 to 24 carbon atoms and alcohols each having from 10 to 24 carbon atoms) as disclosed in JP-B-58-33541, British Patent 927,446, JP-A-55-126238 and JP-A-58-90633, metal salts of higher fatty acids as disclosed in U.S. Pat. No. 3,933,516, esters of straight-chain higher fatty acids and straight-chain higher alcohols disclosed in JP-A-58-50534, and branched alkyl group-containing higher fatty acid-higher alcohol esters as disclosed in International Publication (WO) No. 90108115.

Of these, the polyorganosiloxanes that can be used include modified polysiloxanes such as polyorganosiloxanes having alkyl groups of 5 or more carbon atoms, polyalkylsiloxanes having polyoxyalkylene groups on their side chains and polyorganosiloxanes having alkoxyl, hydroxyl, hydrogen, carboxyl, amino or mercapto groups on their side chains, as described in JP-B-53-292, JP-B-55-49294 and JP-A-60-140351, as well as polyalkylsiloxanes such as polydimethylsiloxane and polydiethylsiloxane, and polyarylsiloxanes such as polydiphenylsiloxane and polymethylphenylsiloxane, which are generally known. Further, block copolymers having siloxane units and graft copolymers having siloxane units on their side chains as shown in JP-A-60-191240 can also be used.

The higher fatty acids and derivatives thereof, and the higher alcohols and derivatives thereof include fatty acids; metal salts of higher fatty acids; higher fatty acid esters; higher fatty acid amides; polyhydric alcohol esters of higher fatty acids; higher aliphatic alcohols; monoalkyl phosphites, dialkyl phosphites, trialkyl phosphites, monoalkyl phosphates, dialkyl phosphates and trialkyl phosphates of higher aliphatic alcohols; higher aliphatic alkylsulfonic acids; and amides thereof. Details of these materials constituting the lubricating layers are described in JIII Journal of Technical Disclosure No. 94-6023, Japan Institute of Invention and Innovation, and the materials can be used according thereto.

There is no particular limitation on the amount of these lubricants used. For exhibiting sufficient lubricity and scratch resistance, however, the content thereof is preferably from 0.001 g/m$^2$ to 0.1 g/m$^2$, and more preferably from 0.005 g/m$^2$ to 0.05 g/m$^2$.

Many of these lubricants are poor in solubility in solvents, because of their high hydrophobicity. Accordingly, methods of dissolving the lubricants in non-polar organic solvents such as toluene and xylene or methods of dispersing the lubricants in coating solutions are employed. However, the non-polar organic solvents are difficult to handle, so that the dispersing methods are preferred.

As the methods of dispersing the lubricants, emulsifying and dispersing methods generally known can be utilized. Specifically mentioned are a method of dissolving the lubricant in an organic solvent and emulsifying it in water, a method of melting the lubricant at high temperature and emulsifying it in water, and a solid dispersing method using a ball mill or a sand grinder. Such emulsifying and dispersing methods are described in *Nyuka•Bunsan Gijutsu Oyo Handbook* (Emulsifying and Dispersing Technique Application Handbook), edited by Karime, Koishi and Hidaka (Science Forum edition).

The silver halide photographic material of the present invention may further have a magnetic recording layer as described in JP-A-6-059357, for recording various pieces of information. The magnetic recording layer is preferably used on the back face of the support, and can be formed by coating or printing. Further, for recording various pieces of information, an optically recording space may be given to the photographic material.

The support thus coated with the undercoat layer and the back layer is coated with at least one silver halide light-sensitive layer.

The photographic material of the present invention comprises the support coated with at least one light-sensitive layer. A typical example thereof has at least one light-sensitive layer on the support, the light-sensitive layer comprising a plurality of silver halide emulsion layers that are substantially identical in color sensitivity and different in sensitivity. The light-sensitive layer is a unit light-sensitive layer having sensitivity to any one of blue, green and red lights. In general, in the unit sensitive layer of the multilayer silver halide color photographic material, a red-sensitive layer, a green-sensitive layer and a blue-sensitive layer are arranged from the support side in this order. However, the above-mentioned order of arrangement may be reversed, or such an arrangement that a light-sensitive layer having a different color sensitivity is sandwiched between layers having the same color sensitivity maybe taken, depending on its purpose. Alight-insensitive layer may be placed between the above-mentioned silver halide sensitive layers, or as the uppermost layer or the lowermost layer. They may contain couplers, DIR compounds or color stain preventing agents, which are described later. As the plurality of silver halide emulsion layers constituting each unit light-sensitive layer, two layers of a high-speed emulsion layer and a low-speed emulsion layer are preferably arranged so as to decrease in sensitivity toward the support in turn, as described in DE 1,121,470 and GB 923,045. Further, low-speed emulsion layers may be arranged apart from the support and high-speed emulsion layers may be arranged near to the support, as described in JP-A-57-112751, JP-A-62-200350, JP-A-62-206541 and JP-A-62-206543.

For example, the light-sensitive layers can be arranged in the order of low-speed blue-sensitive layer (BL)/high-speed blue-sensitive layer (BH)/ high-speed green-sensitive layer (GH)/low-speed green-sensitive layer (GL)/ high-speed red-sensitive layer (RH) /low-speed red-sensitive layer (RL), in the order of BH/BL/GL/GH/RH/RL, or in the order of BH/BL/GH/GL/RL/RH, from the side farthest from the support.

As described in JP-B-55-34932, layers may also be arranged in the order of blue-sensitive layer/GH/RH/GL/RL from the side farthest from the support. Further, layers may also be arranged in the order of blue-sensitive layer/GL/RL/GH/RH from the side farthest from the support, as described in JP-A-56-25738 and JP-A-62-63936.

Furthermore, three layers different in sensitivity may be arranged so that the upper layer is a silver halide emulsion layer having the highest sensitivity, the middle layer is a silver halide emulsion layer having a sensitivity lower than that of the upper layer, the lower layer is a silver halide emulsion layer having a sensitivity further lower than that of the middle layer, and the sensitivity of the three layers is successively decreased toward the support, as described in JP-B-49-15495. Even when such three layers different in sensitivity are arranged, they may be arranged in the order of middle-speed emulsion layer/high-speed emulsion layer/low-speed emusion layer from the side apart from the support in the layer having the same color sensitivity, as described in JP-A-59-202464.

In addition, they may be arranged in the order of high-speed emulsion layer/low-speed emulsion layer/middle-speed emulsion layer, or low-speed emulsion layer/middle-speed emulsion layer/high-speed emulsion layer. In the case of four layers or more, the arrangement may also be changed as described above.

In order to improve color reproducibility, a donor layer (CL) having interlayer effect may be preferably arranged next to or in the vicinity of a main light-sensitive layer such as BL, GL or RL, the donor layer being different from the main light-sensitive layer in spectral sensitivity distribution, as described in U.S. Pat. Nos. 4,663,271, 4,705,744 and 4,707,436, JP-A-62-160448 and JP-A-63-89850.

A preferred silver halide used in the present invention is silver iodobromide, silver iodochloride or silver iodochlorobromide containing about 30 mole % or less of silver iodide. A particularly preferred silver halide is silver iodobromide or silver iodochlorobromide containing from about 2 mole % to about 10 mole % of silver iodide.

Silver halide grains contained in the photographic emulsions may have a regular crystal form such as a cubic, an octahedral or a tetradecahedral form, an irregular crystal form such as a spherical or a tabular form, a form having a crystal defect such as a twin plane, or a composite form thereof.

The silver halides may be either finely divided grains having a grain size of about 0.2 μm or less, or large-sized grains having a diameter of a projected area up to about 10 μm. Further, they may be either polydisperse emulsions or monodisperse emulsions.

The silver halide emulsions which can be used in the present invention can be prepared, for example, according to the methods described in *Research Disclosure* (hereinafter abbreviated as "RD"), No. 17643, pages 22 and 23, "I. Emulsion Preparation and Types" (December, 1978), ibid., No. 18716, page 648 (November, 1979), ibid., No. 307105, pages 863 to 865 (November, 1979), P. Glafkides, *Chemie et Phisique Photographique* (Paul Montel, 1967), G. F. Duffin, Photographic Emulsion Chemistry (Focal Press, 1966) and V. L. Zelikman et al., *Making and Coating Photographic Emulsion* (Focal Press, 1964).

Monodisperse emulsions described in U.S. Pat. Nos. 3,574,628 and 3,655,394 and GB 1,413,748 are also preferably used.

Further, tabular grains having an aspect ratio of about 3 or more can also be used in the present invention. The tabular grains can be readily prepared according to methods as described in Gutoff, *Photographic Science and Engineering, Vol.* 14, pages 248 to 257 (1970), U.S. Pat. Nos. 4,434,226, 4,414,310, 4,433,048 and 4,439,520, and GB 2,112,157.

The crystal structure may be uniform, or the interior of the grain may be different from the surface thereof in halogen composition. The crystal structure may also be laminar. Silver halide grains different in composition may be joined together by epitaxial bonding. Further, silver halide grains may be joined to compounds other than silver halides, such as silver rhodanide and lead oxide. Furthermore, mixtures of grains having various crystal forms may also be used.

The above-mentioned emulsions may be any of surface latent image type emulsions in which latent images are mainly formed on the surfaces of the grains, internal latent image type emulsions in which latent images are mainly formed in the interiors of the grains and emulsions in which latent images are formed both on the surfaces and in the interiors. However, the emulsions are required to be negative type emulsions. One of the internal latent image type emulsions may be a core/shell type emulsion described in JP-A-63-264740. A method for preparing this emulsion is described in JP-A-59-133542. The thickness of a shell of this emulsion is preferably 3 to 40 nm and more preferably 5 to 20 nm, though it varies depending on development processing and the like.

The silver halide emulsions subjected to physical ripening, chemical ripening and spectral sensitization are usually employed. Additives used in such stages are described in RD, No. 17643, ibid., No. 18716 and ibid., No. 307105, and corresponding portions thereof are summarized in a table shown later.

In the photographic materials according to the present invention, two or more kinds of light-sensitive silver halide emulsions which are different in at least one characteristic of grain size, grain size distribution, halogen composition, grain shape and sensitivity can be mixed to use them in the same layer.

Silver halide grains described in U.S. Pat. No. 4,082,553, the surfaces of which are fogged, silver halide grains described in U.S. Pat. No. 4,626,498 and JP-A-59-214852, the interiors of which are fogged, and colloidal silver can be preferably applied to light-sensitive silver halide emulsion layers and/or substantially light-insensitive hydrophilic colloidal layers. The silver halide grains the surfaces and/or the interiors of which are fogged mean silver halide grains that can be uniformly (non-imagewise) developed, independently of non-exposed or exposed areas of the photographic materials. Preparation methods thereof are described in U.S. Pat. No. 4,626,498 and JP-A-59-214852. Silver halides forming internal nuclei of core/shell type silver halide grains the interiors of which are fogged may be different in halogen composition. As the silver halide in which the interiors or the surfaces of the grains are fogged, any of silver chloride, silver chlorobromide, silver iodobromide and silver chloroiodobromide can be used. The mean grain size of these fogged silver halide grains is preferably from 0.01 μm to 0.75 μm, and more preferably from 0.05 μm to 0.6 μm. Although either an emulsion comprising regular grains or a polydisperse emulsion may be used, a monodisperse emulsion (in which at least 95% of the weight or the grain number of silver halide grains has a grain size within ±40% of a mean grain size) is preferably used.

In the present invention, it is preferred to use fine light-insensitive silver halide grains. The fine light-insensitive silver halide grains are fine silver halide grains which are not sensitive to light on imagewise exposure for obtaining dye images and are not substantially developed by their processing, and it is preferred that they are not fogged previously. The fine silver halide grains contain 0 to 100 mol % of silver bromide, and may contain silver chloride and/or silver iodide, as needed. It is preferred that the fine silver halide grains contain 0.5 to 10 mol % of silver iodide. The fine silver halide grains preferably have a mean grain size (i.e., a mean equivalent circle diameter: a mean value of circle-corresponding diameters of projected areas) of from 0.01 μm to 0.5 μm, and more preferably from 0.02 μm to 0.2 μm.

The fine silver halide grains can be prepared in a manner similar to that for preparing conventional light-sensitive silver halide grains. The surfaces of the silver halide grains are not required to be optically sensitized, and is not also required to be spectrally sensitized. It is however preferred that well-known stabilizers such as triazole, azaindene, benzothiazolium, mercapto and zinc compounds are previously added to the fine silver halide grains before they are added to coating solutions. Colloidal silver can be preferably added to the fine silver halide grain-containing layers.

The photographic materials of the present invention are applied preferably in a silver content of 6.0 $g/m^2$ or less, and most preferably in a silver content of 4.5 $g/m^2$ or less.

Photographic additives that can be used in the present invention are also described in Research Disclosure references, and described portions relating thereto are shown in the following table.

| Additive | RD 17643 | RD 18716 | RD 307105 |
|---|---|---|---|
| 1. Chemical Sensitizers | p. 23 | p. 648, right col. | p. 866 |
| 2. Sensitivity Inceasing Agents | | p. 648, right col. | |
| 3. Spectral Sensitizers Supersensitizers | pp. 23–24 | p. 648, right col. to p. 649, right col. | pp. 866–868 |
| 4. Brighteners | p. 24 | p. 647, right col. | p. 868 |
| 5. Light Absorbers, Filter Dyes, UV Absorbers | pp. 25–26 | p. 649, right col. to p. 650 left col. | p. 873 |
| 6. Binders | p. 26 | p. 651, left col. | pp. 873–874 |
| 7. Plasticizers Lubricants | p. 27 | p. 650, right col. | p. 876 |
| 8. Coating Aids Surfactants | pp. 26–27 | p. 650, right col. | pp. 875–876 |
| 9. Antistatic Agents | p. 27 | p. 650, right col. | pp. 876–877 |
| 10. Matting agents | | | pp. 878–879 |

Although various color couplers can be used in the photographic materials of the present invention, the following couplers are particularly preferred.

Yellow Couplers: couplers represented by formulas (I) and (II) described in EP-A-502,424 (particularly, Y-28 found on page 18); couplers represented by formula (I) described in claim 1 of EP-A-568,037; couplers represented by formula (I) found in lines 45 to 55 of column 1 of U.S. Pat. No. 5,066,576; couplers represented by formula (I) described in paragraph 0008 of JP-A-4-274425; couplers described in claim 1 on page 40 of EP-A-498,381 (particularly, D-35 found on page 18); couplers represented by formula (Y) found on page 4 of EP-A 447,969 [particularly, Y-1 (page 17) and Y-54 (page 41)]; and couplers represented by formulas (II) to (IV) found in lines 36 to 58 of column 7 of U.S. Pat. No. 4,476,219 (particularly, II-17 and II-19 (column 17), and II-24 (column 19)).

Magenta Couplers: L-57 (page 11, lower right column), L-68 (page 12, lower right column) and L-77 (page 13, lower right column) described in JP-A-3-39737; [A-4]-63 (page 134), and [A-4]-73 and [A-4]-75 (page 139) described in European Patent 456,257; M-4 and M-6 (page 26), and M-7 (page 27) described in European Patent 486,965; M-45 (page 19) described in EP-A-571,959; M-1 (page 6) described in JP-A-5-204106; and M-22 found in paragraph 0237 of JP-A-4-362631.

Cyan Couplers: CX-1,-3,-4,-5,-11,-12,-14 and -15 (pages 14 to 16) of JP-A-4-204843; C-7 and -10 (page 35), C-34 and -35 (page 37), and (I-1) and (I-17) (pages 42 to 43) of JP-A-4-43345; and couplers represented by formulas (Ia) and (Ib) described in claim 1 of JP-A-6-67385.

Polymer Couplers: P-1 and P-5 (page 11) of JP-A-2-44345.

Preferred examples of couplers whose forming dyes have appropriate diffusibility include those described in U.S. Pat. No. 4,366,237, GB 2,125,570, European Patent 96,873 B and DE 3,234,533. Preferred examples of couplers for correcting unnecessary absorption of developed dyes include yellow-colored cyan couplers represented by formulas (CI), (CII), (CIII) and (CIV) described in EP-A-456,257, page 5 (particularly, YC-86 found on page 84); yellow-colored magenta couplers ExM-7 (page 202), Ex-1 (page 249) and Ex-7 (page 251) described in the above-mentioned EP; magenta-colored cyan coupler CC-9 (column 8) and CC-13 (column 10) described in U.S. Pat. No. 4,833,069; and colorless masking couplers represented by (2) described in column 8 of U.S. Pat. No. 4,387,136and formula (A) described in claim 1 of WO92/11575 (particularly, compounds exemplified on pages 36 to 45).

Compounds reacting with the oxidants of developing agents to release photographically useful compound residues (couplers are also included) are include the following compounds:

Development inhibitor-releasing compounds: compounds represented by formulas (I), (II), (III) and (IV) described in EP-A-378,236, page 11 (particularly, T-101 (page 30), T-104 (page 31), T-113 (page 36), T-131 (page 45), T-144 (page 51), and T-158 (page 58)); compounds represented by formula (I) described in EP-A-436,938, page 7 (particularly, D-49 (page 51)); compounds represented by formula (1) described in EP-A-568,037 (particularly, (23) (page 11)); and compounds represented by formulas (I), (II) and (III) described on pages 5 and 6 of EP-A-440,195 (particularly, I-(1) found on page 29);

Bleaching accelerator-releasing compounds: compounds represented by formulas (I) and (I') found on page 5 of EP-A-310,125 (particularly, (60) and (61) found on page 61); and compounds represented by formula (I) described in claim 1 of JP-A-6-59411 (particularly, (7) (page 7));

Ligand-releasing compounds: compounds represented by LIG-X described in claim 1 of U.S. Pat. No. 4,555,478 (particularly, compounds found in lines 21 to 41 of column 12);

Leuco dye-releasing compounds: compounds 1 to 6 described in columns 3 to 8 of U.S. Pat. Nos. 4,749, 641;

Fluorescent dye-releasing compounds: compounds represented by COUP-DYE described in claim 1 of U.S. Pat. No. 4,774,181 (particularly, compounds 1 to 11 described in columns 7 to 10);

Development accelerator- or fogging agent-releasing compounds: compounds represented by formulas (1), (2) and (3) described in columns 3 of U.S. Pat. No. 4,656,123 (particularly, (I-22) described in column 25) and ExZK-2 found in lines 36 to 38 on page 75 of EP-A-450,637; and Compounds releasing radicals that do not produce dyes until their removal: compounds represented by formula (I) described in claim 1 of U.S. Pat. No. 4,857,447 (particularly, Y-1 to Y-19 described in columns 25 to 36).

Preferred additives other than couplers are as follows:

Dispersion mediums for oil-soluble organic compounds: P-3,-5,-16,-19,-25,-30,-42,-49,-54,-55,-66,-81,-85, -86 and -93 (pages 140 to 144) of JP-A-62-215272;

Impregnating latexes for oil-soluble organic compounds: latexes described in U.S. Pat. No. 4,199,363;

Scavengers for oxidants of developing agents: compounds represented by formula (I) described in lines 54 to 62 of column 2 of U.S. Pat. No. 4,978,606 (particularly, I-(1), -(2), -(6), and -(12) (columns 4 and 5)) and compounds represented by formulas described in lines 5 to 10 of column 2 of U.S. Pat. No. 4,923,787 (particularly, compound 1 (column 3);

Stain-preventing agents: compounds represented by formulas (I) to (III) described in lines 30 to 33 on page 4 of EP-A-298,32, particularly I-42,-72, III-1 and -27 (pages 24 to 48);

Fading inhibitors: A-6,-7,-20,-21,-23,-24,-25,-26, -30,-37,-40,-42,-48,-63,-90,-92,-94 and -164 (pages 69 to 118) of EP-A-298321; II-1 to III-23 described in columns 25 to 38 of U.S. Pat. No. 5,122,444, particularly III-10; I-1 to III-4 on pages 8 to 12 of EP-A-471347, particularly, II-2; A-1 to -48 described in columns 32 to 40 of U.S. Pat. No. 5,139,931, particularly, A-39 and -42;

Materials for decreasing amounts of color forming enhancers or color-mixing inhibitors (i.e., color stain preventing agents): I-1 to II-15 found on pages 5 to 24 of EP-A-411324, particularly, I-46;

Formalin scavengers: SCV-1 to -28 found on pages 24 to 29 of EP-A-477932, particularly, SCV-8;

Hardeners: H-1,-4,-6,-8, and -14 found on page 17 of JP-A-1-214845; compounds H-1 to -54 represented by formulas (VII) to (XII) described in columns 13 to 23 of U.S. Pat. No. 4,618,573; compounds H-1 to -76 represented by formula (6) described in lower right column on page 8 of JP-A-2-214852, particularly, H-14; and compounds described in claim 1 of U.S. Pat. No. 3,325,287;

Precursors of development inhibitors: P-24,-37 and -39 (pages 6 and 7) of JP-A-62-168139; compounds described in claim 1 of U.S. Pat. No. 5,019,492, particularly, 28 and 29 in column 7;

Preservatives and antifungal agents: I-1 to III-43 described in columns 3 to 15 of U.S. Pat. No. 4,923,790, particularly, II-1,-9,-10,-18 and III-25;

Stabilizers and antifoggants: I-1 to (14) described in columns 6 to 16 of U.S. Pat. No. 4,923,793, particularly, I-1, -60, (2) and (13); compounds 1 to 65 described in columns 25 to 32 of U.S. Pat. No. 4,952,483, particularly, compound 36;

Chemical sensitizers: triphenylphosphine selenide; and compound 50 described in JP-A-5-40324;

Dyes: a-1 to b-20 (particularly, a-1, -12,-18,-27,-35, -36 and b-5) on pages 15 to 18 and V-1 to 23 (particularly V-1) on pages 27 to 29 of JP-A-3-156450; F-I-1 to F-II-43 on pages 33 to 55 of EP-A-445627, particularly, F-I-11 and F-II-8; III-1 to -36 on pages 17 to 28 of EP-A-457153, particularly, III-1 and -3; fine crystal dispersions of Dye-1 to -124 found on pages 8 to 26 of WO 88/04794; compounds 1 to 22 on pages 6 to 11 of EP-A-319999, particularly, compound 1; compounds D-1 to 87 represented by formulas (1) to (3) (pages 3 to 28) of EP-A-519306; compounds 1 to 22 represented by formula (1) (columns 3 to 10) of U.S. Pat. No. 4,268,622; and compounds (1) to (31) represented by formula (I) (columns2 to 9) of U.S. Pat. No. 4,923,788; and Ultraviolet absorbers: compounds (18b) to (18r) represented by formula (1) and compounds 101 to 427 (pages 6 to 9) of JP-A-46-3335; compounds (3) to (66) represented by formula (I) (pages 10 to 44) and compounds HBT-1 to 10 represented by formula (III) (page 14) of EP-A-520938; and compounds (1) to (31) represented by formula (1) (columns 2 to 9) of EP-A-521823.

In the photographic materials of the present invention, the total film thickness of all hydrophilic colloidal layers on the side having an emulsion layer is preferably 28 μm or less, more preferably 23 pm or less, still more preferably 18 μm or less, and particularly preferably 16 μm or less. The film swelling speed $T_{1/2}$ is preferably 30 seconds or less, and more preferably 20 seconds or less. The $T_{1/2}$ is defined as a time required to reach ½ of a saturated film thickness, taking 90% of a maximum thickness of a swelled film reached by processing with a color developing solution at 30° C. for 3 minutes and 15 seconds as the saturated film thickness. The film thickness means a thickness measured under conditions of 25° C.-55% (RH) (for 2 days), and the $T_{1/2}$ can be measured by using a swellometer described in A. Green et al., *Photogr. Sci. Eng.*, Vol.19, No.2, pages 124 to 129. The $T_{1/2}$ can be adjusted by adding a hardening agent to gelatin used as a binder or changing the above-mentioned aging conditions after coating. The swelling rate is preferably from 150% to 400%. The swelling rate can be calculated according to the equation: (maximum swelled film thickness−film thickness)/film thickness, from the maximum thickness of the swelled film under the above-mentioned conditions.

It is also preferred that the support of the present invention is coated with a color negative photographic material described in sample 201 of Example 2 of JP-A-9-146237 or a color reversal photographic material described in sample 101 of Example 1 of JP-A-11-84601.

Finally, evaluation and measuring methods employed in the present invention will be described.

(1) Notch Forming Strengths (a) Notch Forming Strength in TD (i) A convex blade obtained by cutting a semi-circular cylinder having a diameter of 5.5 mm at an angle of 60 degrees and a semi-circular concave blade having a clearance of from 10 μm to 30 μm (specifically, exchange blades for an FNP 7000D notcher puncher manufactured by Fuji Photo Film Co., Ltd.: parts No. A393F0017).

(ii) A sample film is affixed to the concave blade with a double-coated adhesive tape. When the notch strength in TD is measured, the sample film is affixed so that the TD of the sample becomes parallel to the diameter of the semicircle.

(iii) The convex blade is pulled toward the concave blade at a speed of 1 cm/second. At this time, a tension meter is attached to a leading edge of the concave blade, and a maximum load taken to form a notch is read therewith (X g).

(iv) A maximum tensile load is read in a manner similar to that of (iii) without affixture of the film (Y g).

(V) X-Y (g) is taken as the notch forming strength.

(b) Notch Forming Strength in MD

A sample is affixed so as to become parallel to the MD, and measurement is made in the same manner as with (a) the notch forming strength in TD.

(2) Young's Modulus, Breaking Elongation and Breaking Strength

A sample is cut out to a width of 10 mm, and measured at a distance between chucks of 20 mm, at a stretching speed of 2 mm/minute under an atmosphere of 25° C. and 60% RH. Gradients are calculated for each 0.1% between tensile strengths of 0% and 5%, and Young's modulus is determined from the maximum gradient thereof. When the sample is stretched under the above-mentioned conditions, an elongation and a strength at the time when a base is broken (in which a stress on breakage is standardized by a cross-sectional area of the sample before the tensile test) are determined as the breaking elongation and the breaking strength.

(3) Orientation Angle (MOR)

The MOR is measured at both edges of a support after film formation with a molecular orientation meter (MOA-3001A; manufactured by Oji Keisoku Kiki Co. Ltd.) (the interaction of a microwave with dipoles of the support is measured over the whole in-plane directions to indicate its anisotropy as the numerical value).

(4) Unevenness in Thickness (a) MD Unevenness in Thickness 35 mm×1 m samples are collected from a center portion in a transverse direction and both right and left portions each apart 35% of the whole width from the center, and measured at a speed of 600 mm/minute using a continuous thickness meter (an electronic micrometer manufactured by Anritsu Corp.). The difference between the maximum point and the minimum point is taken as the unevenness in thickness.

(b) TD Unevenness in Thickness

A 35 mm×1 m sample is collected from between both right and left portions each apart 35% of the whole width from the center, and measured using the continuous thickness meter in the same manner as in the case of MD. The difference between the maximum point and the minimum point is taken as the unevenness in thickness.

(5) Haze

The haze is measured, based on JIS-K6714.

(6) Total Light Transmittance

The total light transmittance is measured, based on JIS-K6714.

(7) Rate of Thermal Dimensional Change (100° C., 24 hours)

(i) A sample is conditioned in an atmosphere of 25° C. and 60% RH for 12 hours or more, followed by measurement of the length thereof with a pin gauge (taken as L1).

(ii) The sample is placed without tension in a temperature controlled air bath at 100° C. for 24 hours.

(iii) The sample is taken out, and conditioned in an atmosphere of 25° C. and 60% RH for 12 hours or more, followed by measurement of the length thereof with a pin gauge (taken as L2).

(iv) The value obtained by dividing the absolute value of the difference between L1 and L2 by L1 and multiplying the resulting value by 100 is taken as the rate of thermal dimensional change (%).

(8) Intrinsic Viscosity (i) A polyester is dissolved in a mixed solvent of phenol/1,1,2,2-tetrachloroethane (weight ratio: 60/40) to prepare 0.2 g/dl, 0.6 g/dl and 1.0 g/dl solutions.

(ii) The viscosity of the solutions is measured with an Ubbelohde viscometer at 20° C.

(iii) The viscosity is plotted against the concentration, and extrapolated to a concentration of 0. The resulting viscosity is taken as the intrinsic viscosity.

(9) Glass Transition Temperature (Tg), Quantity of Heat of Endothermic Peak Appearing at 100° C. to 170° C.

Measurements are made with a differential thermal analyzer according to the following method.

(i) A sample (20 mg) is set in a stream of nitrogen in an aluminum pan.

(ii) The temperature is elevated to 330° C. at 10° C./minute (lst run).

The following are determined from the thermogram.

(a) Heat of Crystal Fusion:

A base line is interpolated from 330° C. toward 290° C. The heat of fusion is determined from an area surrounded with this and an endothermic peak having a peak between 220° C. and 280° C.

(b) Quantity of Heat of Endothermic Peak Appearing at 100° C. to 170° C.:

The quantity of heat is determined from an area formed by a straight line connecting a base line of 80° C. to 100° C. and a base line of 170° C. to 190° C., and an endothermic peak appearing at 100° C. to 170° C.

(iii) The sample is quenched to room temperature to make it amorphous.

(iv) The temperature is elevated again at 20° C./minute (2nd run).

The following is determined from the thermogram.

(c) Tg:

The arithmetic mean of a temperature at which the deviation from the base line starts and a temperature at which the return to a new base line takes place is taken as Tg.

(10) Curl Given by Winding

After conditioning in an atmosphere of 25° C. and 60% RH for 3 hours, a sample is wound around a core tube and fixed with a tape. Then, the sample is core set at 80° C. for 2 hours. After cooling in an atmosphere of 25° C. and 60% RH for 3 hours, the sample is unwound, and the radius of its innermost periphery is measured with a slide caliper. The reciprocal of this radius (m) is taken as the value of a curl given by winding.

(11) Gutter-shaped Curl After conditioning in an atmosphere of 25° C. and 10% RH for 3 hours, a sample is cut to a size of 3 mm in MD×50 mm in TD. The radius of curvature (m) thereof is measured using a curl plate described in ANSI/ASC PH1.29-1985, and the reciprocal thereof is taken as the value of a gutter-shaped curl.

The present invention will be illustrated with reference to examples below, but these are not to be construed as limiting the present invention.

EXAMPLE I (1) Polymerization of Polyesters (1-1) Polymerization of Polyesters for the Present Invention

(a) Example I-1

Spherical silica particles having a mean particle size of 0.3 $\mu$m (0.1%) were added to 100 parts of dimethyl 2,6-naphthalenedicarboxylate, 58 parts of ethylene glycol, 0.029 part of manganese acetate tetrahydrate and 0.028 parts of antimony trioxide, and the resulting mixture was heated to 200° C. with stirring. The temperature was elevated to 235° C. while removing methanol produced as a by-product. After the by-production of methanol was completed, 0.03 part of trimethyl phosphate was added thereto. Then, the pressure was reduced to 0.3 Torr while elevating the temperature to 285° C. Thus, polyesters having intrinsic viscosities shown in Table I-1 were obtained by changing the reaction time. Dyes described in JP-A-7-168309, compounds I-6 and I-24, were each further added to the solid matter in an amount of 54 ppm.

(b) Examples I-2 and I-3

Dimethyl 2,6-naphthalenedicarboxylate and dimethyl adipate were dispersed in ethylene glycol and an addition product of two ethylene oxides to bisphenol A (BPA•2EO). Then, 0.029 part of manganese acetate tetrahydrate, 0.028 parts of antimony trioxide and 0.1% of spherical silica particles having a mean particle size of 0.3 μm were added to 100 parts of the total of dimethyl 2,6-naphthalenedicarboxylate and dimethyl adipate, and heated with stirring to conduct the reaction. The temperature was elevated to 235° C. while removing methanol produced as a by-product. After the by-production of methanol was completed, 0.03 part of trimethyl phosphate was added thereto. Then, the pressure was reduced to 0.3 Torr while elevating the temperature to 285° C. to conduct the polymerization by changing the reaction time. Dyes described in JP-A-7-168309, compounds I-6 and I-24, were each further added to the solid matter in an amount of 54 ppm. The copolymerization composition ratios of adipic acid (AA) and BPA•2EO and the intrinsic viscosities of polyesters thus obtained are shown in Table I-1.

(c) Examples I-4 and I-5

Dimethyl 2,6-naphthalenedicarboxylate was dispersed in ethylene glycol and cyclohexanedimethanol. Then, 0.029 part of manganese acetate tetrahydrate, 0.028 parts of antimony trioxide and 0.1% of spherical silica particles having a mean particle size of 0.3 μm were added to 100 parts of dimethyl 2,6-naphthalenedicarboxylate, and heated with stirring to conduct the reaction. The temperature was elevated to 235° C. while removing methanol produced as a by-product. After the by-production of methanol was completed, 0.03 part of trimethyl phosphate was added thereto. Then, the pressure was reduced to 0.3 Torr while elevating the temperature to 285° C. to obtain polyesters different in viscosity by changing the reaction time. Dyes described in JP-A-7-168309, compounds I-6 and I-24, were each further added to the solid matter in an amount of 54 ppm. The copolymerization composition ratios of cyclohexanedimethanol (CHDM) and the intrinsic viscosities of the polyesters are shown in Table I-1.

(d) Examples I-6 and I-7

Dimethyl 2,6-naphthalenedicarboxylate and dimethyl isophthalate were dispersed in $HO(CH_2CH_2O)_8OH$ and ethylene glycol. Then, 0.029 part of manganese acetate tetrahydrate, 0.028 parts of antimony trioxide and 0.1% of spherical silica particles having a mean particle size of 0.3 μm were added to 100 parts of the total of dimethyl 2,6-naphthalenedicarboxylate and dimethyl isophthalate, and heated with stirring to conduct the reaction. The temperature was elevated to 235° C. while removing methanol produced as a by-product. After the by-production of methanol was completed, 0.03 part of trimethyl phosphate was added thereto. Then, the pressure was reduced to 0.3 Torr while elevating the temperature to 285° C., thereby conducting the polymerization. Dyes described in JP-A-7-168309, compounds I-6 and I-24, were each further added to the solid matter in an amount of 54 ppm. The copolymerization ratios of isophthalic acid (IPA) and $HO(CH_2CH_2O)_8OH$ (OEG) and the intrinsic viscosities of polyesters thus obtained are shown in Table I-1.

(e) Examples I-8 and 1-9

Dimethyl 2,6-naphthalenedicarboxylate (100 parts) and methyl ester of p-hydroxyethoxybenzoic acid (PHBA) (10 parts) were dispersed in neopentyl glycol (NPG) and ethylene glycol. Then, 0.029 part of manganese acetate tetrahydrate, 0.028 parts of antimony trioxide and 0.1% of spherical silica particles having a mean particle size of 0.3 μm were added to 100 parts of dimethyl 2,6-naphthalenedicarboxylate, and heated with stirring to conduct the reaction. The temperature was elevated to 235° C. while removing methanol produced as a by-product. After the by-production of methanol was completed, 0.03 part of trimethyl phosphate was added thereto. Then, the pressure was reduced to 0.3 Torr while elevating the temperature to285° C., thereby conducting the polymerization. Dyes described in JP-A-7-168309, compounds I-6 and I-24, were each further added to the solid matter in an amount of 54 ppm. The copolymerization ratios of NPG and the intrinsic viscosities of polyesters thus obtained are shown in Table I-1.

Preparation of Polymer Blends (a) Example I-10

Commercially available polycyclohexanedimethanol, polyarylate and the above-mentioned PEN having an intrinsic viscosity of 0.58 were mixed in a ratio of 15:15:70. After dried at 160° C. for 2 hours, the resulting mixture was kneaded and extruded at 310° C. by use of a twin-screw extruder. The intrinsic viscosity of a polymer blend thus obtained is shown in Table I-1.

(b) Example I-11

PEN of Example I-1 (intrinsic viscosity=0.58) and the copolyester of Example I-4 were mixed in a blend ratio shown in Table I-1. After dried at 160° C. for 2 hours, the resulting mixture was kneaded and extruded at 310° C. by use of a twin-screw extruder. The intrinsic viscosity of a polymer blend thus obtained is shown in Table I-1.

(c) Example I-12

PEN of Example I-1 (intrinsic viscosity=0.35) and the copolyester of Example I-6 were mixed in a blend ratio shown in Table I-1. After dried at 160° C. for 2 hours, the resulting mixture was kneaded and extruded at 310° C. by use of a twin-screw extruder. The intrinsic viscosity of a polymer blend thus obtained is shown in Table I-1.

(d) Example I-13

After dried at 160° C. for 2 hours, PEN of Example I-1 (intrinsic viscosity=0.58) was kneaded and extruded at 310° C. by use of a single-screw extruder.

(I-2) Polymerization of Polyesters for Comparison

PEN having an intrinsic viscosity shown in Table I-1 was obtained by polymerization according to invention 3 of JP-A-11-202446.

TABLE I-1

Composition of Supports

| | Copolymerization Components of Polyester Composition | | | | | | Copolymerization Components of Polyester Composition to Be Blended | | | | | |
|---|---|---|---|---|---|---|---|---|---|---|---|---|
| | Dicarboxylic Acid | | Diol | | Intrinsic Viscosity | Blend Ratio wt % | Dicarboxylic Acid | | Diol | | Intrinsic Viscosity | Blend Ratio wt % |
| | Component | Content[a)] wt % | Component | Content[b)] wt % | | | Component | Content[a)] wt % | Component | Content[b)] wt % | | |
| Example I-1 | — | — | — | — | 0.58 | 80 | — | — | — | — | 0.35 | 20 |
| Example I-2 | AA | 10 | BPA · 2 EO | 10 | 0.52 | 100 | | | | | | |
| Example I-3 | AA | 20 | BPA · 2 EO | 25 | 0.65 | 100 | | | | | | |
| Example I-4 | — | — | CHDM | 10 | 0.47 | 100 | | | | | | |
| Example I-5 | — | — | CHDM | 30 | 0.55 | 100 | | | | | | |
| Example I-6 | IPA | 2 | OEG | 2 | 0.80 | 100 | | | | | | |
| Example I-7 | IPA | 10 | OEG | 15 | 0.42 | 100 | | | | | | |
| Example I-8 | — | — | NPG | 25 | 0.62 | 100 | | | | | | |
| | | PHBA | | 10 | | | | | | | | |
| Example I-9 | — | — | NPG | 8 | 0.37 | 100 | | | | | | |
| | | PHBA | | 10 | | | | | | | | |
| Example I-10 | — | — | — | — | 0.58 | 70 | Polycyclohexanedimethanol | | | | 0.45 | 15 |
| | | | | | | | Polyarylate | | | | 0.43 | 15 |
| Example I-11 | — | — | — | — | 0.58 | 93 | — | — | CHDM | 10 | 0.47 | 7 |
| Example I-12 | — | — | — | — | 0.35 | 57 | IPA | 2 | OEG | 2 | 0.80 | 43 |
| Example I-13 | — | — | — | — | 0.58 | 100 | | | | | | |
| Comparison | — | — | — | — | 0.58 | 78 | — | — | — | — | 0.40 | 22 |

a) Content to naphthalenedicarboxylic acid b) Content to ethylene glycol (2) Preparation of Polyester Supports (2-1) Film Formation of the Present Invention Each of the polyesters prepared by the above-mentioned methods was formed into pellets, which were dried under reduced pressure at160° C. for 3 hours. The pellets were melted at 310° C. by use of two single-screw extruders installed in tandem with each other. Then, the melt was filtered through a 5-μm mesh filter, and extruded through a T die onto an electrostatically charged casting drum kept at 50° C. to prepare an unstretched film.

This film was subjected to multistage MD stretching, multistage TD stretching, heat treatment between TD stretching and heat setting, and multistage heat setting under the conditions shown in Table I-2.

The thickness and Tg of the supports thus obtained are shown in Table I-3. Each of the formed films had a width of 1.8 m, and both edges thereof were t rimmed to a width of 1.5 m. Then, both edges were subjected to knurling treatment so as to give knurls having a height of 30 μm and a width of 10 mm. The resulting films each having a length of 3000 m were then wound around core tubes having a diameter of 30 cm.

(2—2) Film Formation for Comparison

A PEN film was formed which was stretched larger in TD than in MD according to invention 1 of JP-A-10-293381.

TABLE I-2

Conditions of Film Formation

| | MD Stretching | | | | | | | | |
|---|---|---|---|---|---|---|---|---|---|
| | First-Stage Stretching | | | Second-Stage Stretching | | | First/Second | | Stretching Ratio |
| | Ratio | Temp. ° C. | Speed %/sec. | Ratio | Temp. ° C. | Speed %/sec. | Ratio | Speed | MD/TD |
| Example I-1 | 1.2 | 135 | 150 | 2.4 | 140 | 200 | 2.0 | 1.3 | 1.0 |
| Example I-2 | 1.5 | 120 | 190 | 2.2 | 130 | 230 | 1.5 | 1.3 | 1.2 |
| Example I-3 | 1.1 | 100 | 13 | 1.4 | 120 | 20 | 1.1 | 1.5 | 1.1 |
| Example I-4 | 1.1 | 130 | 30 | 3.3 | 137 | 70 | 3.0 | 2.3 | 1.4 |
| Example I-5 | 1.1 | 145 | 50 | 2.3 | 153 | 150 | 2.1 | 3.0 | 0.8 |
| Example I-6 | 1.2 | 125 | 80 | 3.0 | 140 | 85 | 2.5 | 1.1 | 1.1 |
| Example I-7 | 1.3 | 110 | 150 | 1.8 | 115 | 300 | 1.4 | 2.0 | 0.7 |
| Example I-8 | 1.2 | 110 | 105 | 2.1 | 125 | 270 | 1.8 | 2.6 | 0.9 |
| Example I-9 | 1.4 | 120 | 150 | 2.0 | 125 | 250 | 1.4 | 1.7 | 1.4 |
| Example I-10 | 1.5 | 157 | 100 | 2.0 | 159 | 120 | 1.3 | 1.2 | 1.1 |

TABLE I-2-continued

| Conditions of Film Formation | | | | | | | | | |
|---|---|---|---|---|---|---|---|---|---|
| Example I-11 | 1.5 | 133 | 100 | 2.0 | 135 | 120 | 1.3 | 1.2 | 1.1 |
| Example I-12 | 1.5 | 129 | 100 | 2.0 | 131 | 120 | 1.3 | 1.2 | 1.1 |
| Example I-13 | 1.2 | 135 | 150 | 2.4 | 140 | 200 | 2.0 | 1.3 | 1.0 |
| Comparison | 3.3 | 110 | 100 | — | — | — | — | — | — |

| | TD Stretching | | | | | | | |
|---|---|---|---|---|---|---|---|---|
| | First-Stage Stretching | | | Second-Stage Stretching | | | | |
| | | Temp. | Speed | | Temp. | Speed | First/Second | |
| | Ratio | ° C. | %/sec. | Ratio | ° C. | %/sec. | Ratio | Speed |
| Example I-1 | 1.2 | 142 | 30 | 2.4 | 146 | 80 | 2.0 | 2.7 |
| Example I-2 | 1.4 | 125 | 20 | 2.1 | 135 | 40 | 1.5 | 2.0 |
| Example I-3 | 1.1 | 110 | 70 | 1.3 | 230 | 160 | 1.2 | 2.3 |
| Example I-4 | 1.1 | 140 | 70 | 2.4 | 148 | 100 | 2.2 | 1.4 |
| Example I-5 | 1.3 | 155 | 50 | 2.4 | 157 | 120 | 1.8 | 2.4 |
| Example I-6 | 1.5 | 145 | 150 | 2.1 | 155 | 200 | 1.4 | 1.3 |
| Example I-7 | 1.1 | 115 | 12 | 3.0 | 120 | 35 | 2.7 | 2.9 |
| Example I-8 | 1.6 | 125 | 100 | 1.8 | 135 | 140 | 1.1 | 1.4 |
| Example I-9 | 1.4 | 130 | 40 | 2.7 | 133 | 60 | 1.9 | 1.5 |
| Example I-10 | 1.3 | 159 | 80 | 2.5 | 159 | 140 | 1.9 | 1.8 |
| Example I-11 | 1.3 | 135 | 80 | 2.5 | 135 | 140 | 1.9 | 1.8 |
| Example I-12 | 1.3 | 131 | 80 | 2.5 | 131 | 140 | 1.9 | 1.8 |
| Example I-13 | 1.2 | 142 | 30 | 2.4 | 146 | 80 | 2.0 | 2.7 |
| Comparison | 1.65 | 125 | 100 | 2 | 135 | 100 | 1.2 | 1.0 |

| | Heat Treatment between TD Stretching and Heat Setting | | | Heat Setting | | | | | |
|---|---|---|---|---|---|---|---|---|---|
| | | | | First-Stage Heat Setting | | | Second-Stage Heat Setting | | |
| | Temp. ° C. | Time Sec. | Contraction % | Temp. ° C. | Time sec. | Contraction % | Temp. ° C. | Time sec. | Contraction % |
| Example I-1 | 175 | 20 | 1 | 220 | 10 | 0.5 | 205 | 10 | 1 |
| Example I-2 | 150 | 30 | 3 | 210 | 20 | 1 | 203 | 25 | 3 |
| Example I-3 | 125 | 170 | 7 | 200 | 50 | 0 | 190 | 60 | 10 |
| Example I-4 | 160 | 90 | 0 | 205 | 10 | 2 | 200 | 20 | 4 |
| Example I-5 | 195 | 6 | 0 | 265 | 2 | 0.5 | 235 | 3 | 1.5 |
| Example I-6 | 180 | 20 | 2 | 230 | 30 | 2 | 210 | 30 | 3 |
| Example I-7 | 130 | 140 | 9 | 215 | 60 | 1 | 200 | 40 | 1.5 |
| Example I-8 | 135 | 120 | 5 | 195 | 100 | 0 | 192 | 75 | 6 |
| Example I-9 | 140 | 60 | 4 | 235 | 15 | 1.5 | 220 | 15 | 3.5 |
| Example I-10 | 185 | 40 | 1 | 230 | 5 | 0.5 | 215 | 5 | 1.5 |
| Example I-11 | 185 | 40 | 1 | 230 | 5 | 0.5 | | | |
| Example I-12 | — | — | — | 230 | 5 | 0.5 | 215 | 5 | 1.5 |
| Example I-13 | 175 | 20 | 1 | 220 | 10 | 0.5 | 205 | 10 | 1 |
| Comparison | 85 | 2 | 0 | 180 | 5 | 0 | 225 | 15 | 5 |

(3) Evaluation of Supports

The supports of the present invention and comparison thus obtained were evaluated, and results thereof are shown in Table I-3. For each sample, measurements were made at edge portions (10 cm from trimmed edges) in film formation and a center portion, which showed the greatest orientation angle. A Strograph R2 type tensile tester manufactured by Toyo Seiki Co., Ltd. was used for measuring the breaking elongation and the breaking strength.

TABLE I-3

| Evaluation of Supports | | | | | | | | | | | |
|---|---|---|---|---|---|---|---|---|---|---|---|
| | | Notch Forming Properties | | | | | | | | Breaking | |
| | | Notch Forming | | | | | Breaking Strength | | | Elongation | |
| | | Strength | | | Flash Occurrence | | MD | TD | | MD | TD |
| | | MD g | TD g | MD/TD | MD % | TD % | $kg/mm^2$ | $Kg/mm^2$ | MD/TD | % | % |
| Example | Center | 850 | 850 | 1.0 | 0 | 0 | 9.7 | 9.6 | 1.0 | 90 | 80 |
| I-1 | Edges | 890 | 880 | 1.0 | 0 | 0 | 10.0 | 10.0 | 1.0 | 88 | 78 |
| Example | Center | 950 | 860 | 1.1 | 0 | 0 | 10.5 | 9.3 | 1.1 | 70 | 80 |
| I-2 | Edges | 990 | 920 | 1.1 | 0 | 0 | 11.0 | 9.7 | 1.1 | 68 | 77 |

TABLE I-3-continued

Evaluation of Supports

| | | | | | | | | | | | |
|---|---|---|---|---|---|---|---|---|---|---|---|
| Example | Center | 450 | 380 | 1.2 | 0 | 0 | 5.3 | 5.1 | 1.1 | 125 | 135 |
| I-3 | Edges | 550 | 460 | 1.2 | 0 | 0 | 4.8 | 4.5 | 1.1 | 119 | 130 |
| Example | Center | 1700 | 1200 | 1.4 | 0 | 0 | 16.7 | 11.2 | 1.4 | 40 | 70 |
| I-4 | Edges | 1720 | 1230 | 1.4 | 0 | 0 | 16.9 | 11.5 | 1.5 | 40 | 70 |
| Example | Center | 700 | 880 | 0.8 | 0 | 0 | 7.9 | 9.4 | 0.8 | 110 | 70 |
| I-5 | Edges | 730 | 900 | 0.8 | 0 | 0 | 8.3 | 9.9 | 0.8 | 108 | 68 |
| Example | Center | 1930 | 1860 | 1.0 | 0 | 0 | 17.1 | 16.8 | 1.0 | 22 | 33 |
| I-6 | Edges | 2000 | 1820 | 1.1 | 0 | 0 | 17.8 | 17.2 | 1.1 | 20 | 30 |
| Example | Center | 700 | 1090 | 0.6 | 0 | 0 | 8.1 | 9.3 | 0.9 | 108 | 66 |
| I-7 | Edges | 600 | 1000 | 0.6 | 0 | 0 | 8.3 | 10.9 | 0.8 | 100 | 60 |
| Example | Center | 550 | 610 | 0.9 | 0 | 0 | 7.5 | 8.1 | 0.9 | 110 | 100 |
| I-8 | Edges | 630 | 690 | 0.9 | 0 | 0 | 8.1 | 8.4 | 1.0 | 106 | 95 |
| Example | Center | 1050 | 750 | 1.4 | 0 | 0 | 11.3 | 8.6 | 1.4 | 80 | 50 |
| I-9 | Edges | 1140 | 830 | 1.4 | 0 | 0 | 11.6 | 9.1 | 1.3 | 77 | 45 |
| Example | Center | 1200 | 1090 | 1.1 | 0 | 0 | 14.0 | 12.9 | 1.1 | 80 | 70 |
| I-10 | Edges | 1230 | 1140 | 1.1 | 0 | 0 | 14.3 | 13.0 | 1.1 | 78 | 68 |
| Example | Center | 1500 | 1360 | 1.1 | 0 | 0 | 15.0 | 13.8 | 1.1 | 100 | 90 |
| I-11 | Edges | 1800 | 1620 | 1.1 | 0 | 0 | 17.9 | 15.1 | 1.2 | 75 | 60 |
| Example | Center | 900 | 820 | 1.1 | 0 | 0 | 9.7 | 9.0 | 1.1 | 120 | 110 |
| I-12 | Edges | 1380 | 1290 | 1.1 | 1 | 1 | 13.6 | 13.3 | 1.0 | 90 | 70 |
| Example | Center | 1250 | 1150 | 1.1 | 0 | 0 | 13.5 | 14.0 | 1.0 | 120 | 100 |
| I-13 | Edges | 1350 | 1250 | 1.1 | 1 | 0 | 13.9 | 14.5 | 1.0 | 115 | 95 |
| Compar- | Center | 2300 | 2400 | 1.0 | 7 | 8 | 23 | 25 | 1.1 | 270 | 300 |
| ison | Edges | 2900 | 3000 | 1.0 | 11 | 14 | 28 | 31 | 1.1 | 230 | 240 |

| | | Cutting Properties | | | | Orientation Angle | | Thickness | | |
|---|---|---|---|---|---|---|---|---|---|---|
| | | Cutting Load | | Poor Cutting | | Left | Right | Aver- | Unevenness | |
| | | MD g | TD g | MD % | TD % | deg. | deg. | age μm | MD μm | TD μm |
| Example | Center | 650 | 600 | 0 | 0 | 10 | 12 | 100 | 1 | 2 |
| I-1 | Edges | 670 | 620 | 0 | 0 | | | | | |
| Example | Center | 620 | 660 | 0 | 0 | 14 | 16 | 95 | 2 | 3 |
| I-2 | Edges | 650 | 680 | 0 | 0 | | | | | |
| Example | Center | 410 | 450 | 0 | 0 | 18 | 19 | 90 | 3 | 4 |
| I-3 | Edges | 450 | 490 | 0 | 0 | | | | | |
| Example | Center | 700 | 720 | 0 | 0 | 3 | 5 | 110 | 0 | 1 |
| I-4 | Edges | 710 | 720 | 0 | 0 | | | | | |
| Example | Center | 660 | 580 | 0 | 0 | 7 | 9 | 120 | 0 | 1 |
| I-5 | Edges | 680 | 600 | 0 | 0 | | | | | |
| Example | Center | 720 | 730 | 0 | 0 | 8 | 8 | 150 | 0 | 1 |
| I-6 | Edges | 740 | 750 | 0 | 0 | | | | | |
| Example | Center | 630 | 520 | 0 | 0 | 16 | 15 | 140 | 2 | 3 |
| I-7 | Edges | 670 | 550 | 0 | 0 | | | | | |
| Example | Center | 550 | 500 | 0 | 0 | 14 | 15 | 130 | 2 | 3 |
| I-8 | Edges | 580 | 530 | 0 | 0 | | | | | |
| Example | Center | 600 | 680 | 0 | 0 | 12 | 12 | 115 | 2 | 2 |
| I-9 | Edges | 630 | 700 | 0 | 0 | | | | | |
| Example | Center | 690 | 710 | 0 | 0 | 5 | 6 | 105 | 1 | 1 |
| I-10 | Edges | 700 | 720 | 0 | 0 | | | | | |
| Example | Center | 700 | 710 | 0 | 0 | 30 | 31 | 105 | 4 | 7 |
| I-11 | Edges | 740 | 750 | 1 | 1 | | | | | |
| Example | Center | 640 | 660 | 0 | 0 | 37 | 39 | 105 | 5 | 8 |
| I-12 | Edges | 690 | 720 | 0 | 0 | | | | | |
| Example | Center | 900 | 850 | 0 | 0 | 14 | 16 | 100 | 3 | 5 |
| I-13 | Edges | 950 | 870 | 0 | 1 | | | | | |
| Compar- | Center | 1030 | 1090 | 5 | 7 | 52 | 59 | 90 | 12 | 19 |
| ison | Edges | 1250 | 1310 | 10 | 13 | | | | | |

| | | Change in Dimension, | | Total Light | | | Curl Given by Winding | | |
|---|---|---|---|---|---|---|---|---|---|
| | | 100° C., 24 hr. | | Transmit- | Haze | Tg | BTA Time | Endother- | Curl Value |
| | | MD % | TD % | tance % | % | ° C. | hr. | mic Peak J/g | $m^{-1}$ |
| Example | Center | 0.10 | 0.08 | 93 | 0.4 | 120 | 20 | 1.2 | 45 |
| I-1 | Edges | 0.11 | 0.10 | 93 | 0.4 | | | | |
| Example | Center | 0.09 | 0.07 | 91 | 0.7 | 115 | 100 | 2.5 | 30 |
| I-2 | Edges | 0.10 | 0.09 | 91 | 0.7 | | | | |
| Example | Center | 0.18 | 0.16 | 98 | 0.1 | 87 | 450 | 4.5 | 20 |
| I-3 | Edges | 0.20 | 0.18 | 98 | 0.1 | | | | |
| Example | Center | 0.24 | 0.21 | 95 | 0.3 | 125 | 50 | 1.7 | 43 |
| I-4 | Edges | 0.24 | 0.21 | 95 | 0.3 | | | | |
| Example | Center | 0.03 | 0.01 | 90 | 0.7 | 135 | 250 | 3.5 | 25 |
| I-5 | Edges | 0.04 | 0.01 | 90 | 0.7 | | | | |

TABLE I-3-continued

Evaluation of Supports

| | | | | | | | | | |
|---|---|---|---|---|---|---|---|---|---|
| Example I-6 | Center | 0.06 | 0.04 | 89 | 0.8 | 115 | 2 | 0.4 | 55 |
| | Edges | 0.07 | 0.04 | 89 | 0.8 | | | | |
| Example I-7 | Center | 0.08 | 0.05 | 92 | 0.6 | 95 | 6 | 0.7 | 50 |
| | Edges | 0.09 | 0.07 | 92 | 0.6 | | | | |
| Example I-8 | Center | 0.22 | 0.20 | 94 | 0.5 | 92 | 70 | 2.0 | 33 |
| | Edges | 0.24 | 0.22 | 94 | 0.5 | | | | |
| Example I-9 | Center | 0.14 | 0.12 | 96 | 0.3 | 113 | 150 | 3.0 | 28 |
| | Edges | 0.18 | 0.14 | 96 | 0.3 | | | | |
| Example I-10 | Center | 0.06 | 0.04 | 73 | 1.8 | 145 | 10 | 0.9 | 48 |
| | Edges | 0.08 | 0.05 | 71 | 1.9 | | | | |
| Example I-11 | Center | 0.29 | 0.27 | 85 | 1.4 | 121 | 10 | 0.9 | 47 |
| | Edges | 0.35 | 0.33 | 84 | 1.5 | | | | |
| Example I-12 | Center | 0.16 | 0.14 | 90 | 0.9 | 117 | 10 | 0.9 | 46 |
| | Edges | 0.20 | 0.19 | 90 | 0.9 | | | | |
| Example I-13 | Center | 0.08 | 0.06 | 94 | 0.5 | 121 | 20 | 1.1 | 48 |
| | Edges | 0.10 | 0.07 | 94 | 0.7 | | | | |
| Comparison | Center | 0.40 | 0.38 | 73 | 2.2 | 111 | 24 | 1.5 | 65 |
| | Edges | 0.55 | 0.41 | 72 | 2.3 | | | | |

(4) Preparation and Evaluation of Photographic Materials

The supports of the present invention and comparison prepared by the above-mentioned methods were subjected to the surface treatment of Example 1 of JP-A-8-57951, and coated with first back layers. Each of the resulting supports was heat treated at a temperature of (Tg of each support—5° C.) for a time shown in Table I-3 (BTA treatment), according to Example 1 of JP-A-8-57951. Then, each support was wound around a spool having a diameter of 7 mm at 80° C. for 2 hours, followed by measurements of the curl given by winding and the quantity of heat of an endothermic peak appearing at 100° C. to 170° C. Results thereof are shown in Table I-3.

An undercoat layer, a second back layer and a third back layer were formed thereon according to Example 1 of JP-A-8-57951. Then, one of the following photographic materials was provided on the side opposite to the back layers as shown in Table I-4.

Color negative photographic material: the same as sample 201 of Example 2 of JP-A-9-146237 (indicated by CN in Table I-4)

Color reversal photographic material: the same as sample 101 of Example 1 of JP-A-11-84601 (indicated by CR in Table I-4)

The resulting photographic materials were slit to a width of 135 system photographic materials (35 mm) or brownie photographic materials (60 mm). Then, the notch forming strength was evaluated by the above-mentioned method, and the cutting properties were evaluated by the following methods. Results thereof are shown in Table I-4. The edge portions in film formation and the center portion, which showed the greatest orientation angle, were used as samples.

TABLE I-4

Evaluation of Photographic Materials

| | | Kind of Photographic Material | Cutting Properties | | | | | Notch Forming Properties | | | | |
|---|---|---|---|---|---|---|---|---|---|---|---|---|
| | | | Cutting Load | | | Poor Cutting | | Notch Forming Strength | | | Flash Occurrence | |
| | | Provided | Md g | TD g | MD/TD | MD % | TD % | MD g | TD g | MD/TD | MD % | TD % |
| Example I-1 | Center | CN | 660 | 610 | 1.1 | 0 | 0 | 870 | 870 | 1.0 | 0 | 0 |
| | Edges | | 680 | 630 | 1.1 | 0 | 0 | 910 | 900 | 1.0 | 0 | 0 |
| Example I-2 | Center | CN | 630 | 670 | 0.9 | 0 | 0 | 970 | 880 | 1.1 | 0 | 0 |
| | Edges | | 650 | 690 | 0.9 | 0 | 0 | 1010 | 940 | 1.1 | 0 | 0 |
| Example I-3 | Center | CN | 420 | 460 | 0.9 | 0 | 0 | 460 | 390 | 1.2 | 0 | 0 |
| | Edges | | 460 | 500 | 0.9 | 0 | 0 | 560 | 470 | 1.2 | 0 | 0 |
| Example I-4 | Center | CR | 710 | 730 | 1.0 | 0 | 0 | 1720 | 1210 | 1.4 | 0 | 0 |
| | Edges | | 720 | 730 | 1.0 | 0 | 0 | 1740 | 1250 | 1.4 | 0 | 0 |
| Example I-5 | Center | CN | 670 | 590 | 1.1 | 0 | 0 | 720 | 900 | 0.8 | 0 | 0 |
| | Edges | | 690 | 610 | 1.1 | 0 | 0 | 740 | 920 | 0.8 | 0 | 0 |
| Example I-6 | Center | CR | 730 | 740 | 1.0 | 0 | 0 | 1950 | 1880 | 1.0 | 0 | 0 |
| | Edges | | 740 | 760 | 1.0 | 0 | 0 | 2000 | 1840 | 1.1 | 0 | 0 |
| Example I-7 | Center | CN | 640 | 530 | 1.2 | 0 | 0 | 710 | 1100 | 0.6 | 0 | 0 |
| | Edges | | 680 | 560 | 1.2 | 0 | 0 | 620 | 1020 | 0.6 | 0 | 0 |
| Example I-8 | Center | CN | 560 | 510 | 1.1 | 0 | 0 | 560 | 630 | 0.9 | 0 | 0 |
| | Edges | | 590 | 540 | 1.1 | 0 | 0 | 650 | 710 | 0.9 | 0 | 0 |
| Example I-9 | Center | CN | 610 | 690 | 0.9 | 0 | 0 | 1070 | 770 | 1.4 | 0 | 0 |
| | Edges | | 640 | 710 | 0.9 | 0 | 0 | 1160 | 850 | 1.4 | 0 | 0 |
| Example I-10 | Center | CN | 690 | 720 | 1.0 | 0 | 0 | 1220 | 1110 | 1.1 | 0 | 0 |
| | Edges | | 710 | 730 | 1.0 | 0 | 0 | 1250 | 1160 | 1.1 | 0 | 0 |
| Example I-11 | Center | CN | 710 | 720 | 1.0 | 0 | 0 | 1520 | 1380 | 1.1 | 0 | 0 |
| | Edges | | 750 | 750 | 1.0 | 1 | 1 | 1800 | 1640 | 1.1 | 1 | 1 |

TABLE I-4-continued

Evaluation of Photographic Materials

| | | Kind of Photographic Material Provided | Cutting Properties | | | | | Notch Forming Properties | | | | |
|---|---|---|---|---|---|---|---|---|---|---|---|---|
| | | | Cutting Load | | | Poor Cutting | | Notch Forming Strength | | | Flash Occurrence | |
| | | | Md g | TD g | MD/TD | MD % | TD % | MD g | TD g | MD/TD | MD % | TD % |
| Example I-12 | Center | CN | 650 | 670 | 1.0 | 0 | 0 | 920 | 840 | 1.1 | 0 | 0 |
| | Edges | | 700 | 730 | 1.0 | 0 | 0 | 1400 | 1310 | 1.1 | 0 | 0 |
| Example I-13 | Center | CN | 920 | 870 | 1.1 | 0 | 0 | 1270 | 1160 | 1.1 | 0 | 0 |
| | Edges | | 970 | 890 | 1.1 | 0 | 1 | 1380 | 1270 | 1.1 | 1 | 0 |
| Comparison | Center | CN | 1060 | 1130 | 0.9 | 7 | 9 | 2350 | 2430 | 1.0 | 9 | 11 |
| | Edges | | 1280 | 1350 | 0.9 | 14 | 18 | 2930 | 3020 | 1.0 | 14 | 16 |

(1) Evaluation Methods of Cutting Properties (a) Cutting Load

1) A sample film was slit to a width of 35 mm in MD and TD.

2) A load of a cutter handle of a cutter inserter (type ENV-M4) manufactured by Noritz Corp. was applied thereto, and a load required to cut the whole width of 35 mm was determined.

(b) Poor Cutting

1) Evaluation was made using a cutter contained in a miniature laboratory developing machine (type FP550B, manufactured by Fuji Photo Film Co., Ltd.).

2) A sample film was cut using "const (constant length mode)". In the ordinary mode, tension is applied to a photographic material in cutting. However, in the const mode, no tension is applied, so that cutting is difficult, resulting in severer evaluation.

3) As a cutter blade, one allowed to wear until the width of a tip thereof became 0.1 mm was used. A blade used for several years or more is simulated.

4) The same sample was cut 100 times, and evaluated as described below to determine the occurrence of poor cutting (when even a part could not be cut). 3% or less is allowable.

(2) Notch Forming Properties (a) Notch Forming Strength

According to the above-mentioned method, 100 measurements were made in MD and TD, respectively, and the average values thereof were determined.

(b) Rate of Occurrence of Flashes

The samples in which the notch forming strength was measured were observed under a stereoscopic microscope of 50 magnifications, and the rate of occurrence was determined from the number of the samples in which flashes were observed.

The polyester supports excellent in cutting properties (film cutting and notch forming properties) in a photofinishing laboratory (processing laboratory), and the silver halide photographic materials using the same were obtained by the polyester films having both transverse direction (TD) and machine direction (MD) breaking strengths of 5 $kg/mm^2$ to 18 $kg/mm^2$, and both TD and MD breaking elongations of 20% to 140% to polyester supports.

EXAMPLE II (1) Polymerization of Polyesters (1—1) Polymerization of Polyesters for the Present Invention

(a) Examples II-1, II-2 and II-3

Spherical silica particles having a mean particle size of 0.3 μm (0.1%) were added to 100 parts of dimethyl 2,6-naphthalenedicarboxylate, 58 parts of ethylene glycol, 0.029 part of manganese acetate tetrahydrate and 0.028 parts of antimony trioxide, and the resulting mixture was heated to 200° C. with stirring. The temperature was elevated to 235° C. while removing methanol produced as a by-product. After the by-production of methanol was completed, 0.03 part of trimethyl phosphate was added thereto. Then, the pressure was reduced to 0.3 Torr while elevating the temperature to 285° C. Thus, polyesters having intrinsic viscosities shown in Table II-1 were obtained by changing the reaction time. Dyes described in JP-A-7-168309, compounds I-6 and I-24, were each further added to the solid matter in an amount of 54 ppm.

(b) Examples II-4 and II-5

Dimethyl 2,6-naphthalenedicarboxylate and dimethyl sebacate were dispersed in ethylene glycol and an addition product of two ethylene oxides tobisphenol A (BPA•2EO). Then, 0.029 part of manganese acetate tetrahydrate, 0.028 parts of antimony trioxide and 0.1% of spherical silica particles having a mean particle size of 0.3 μm were added to 100 parts of the total of dimethyl 2,6-naphthalenedicarboxylate and dimethyl sebacate, and heated with stirring to conduct the reaction. The temperature was elevated to 235° C. while removing methanol produced as a by-product. After the by-production of methanol was completed, 0.03 part of trimethyl phosphate was added thereto. Then, the pressure was reduced to 0.3 Torr while elevating the temperature to 285° C. to conduct the polymerization by changing the reaction time. Dyes described in JP-A-7-168309, compounds I-6 and I-24, were each further added to the solid matter in an amount of 54 ppm. The copolymerization composition ratios of sebacic acid (SA) and BPA•2EO and the intrinsic viscosities of polyesters thus obtained are shown in Table II-1.

(c) Examples II-6, II-7 and II-8

Dimethyl 2,6-naphthalenedicarboxylate was dispersed in ethylene glycol and cyclohexanedimethanol. Then, 0.029 part of manganese acetate tetrahydrate, 0.028 parts of antimony trioxide and 0.1% of spherical silica particles having a mean particle size of 0.3 μm were added to 100 parts of dimethyl 2,6-naphthalenedicarboxylate, and heated with stirring to conduct the reaction. The temperature was elevated to 235° C. while removing methanol produced as a by-product. After the by-production of methanol was completed, 0.03 part of trimethyl phosphate was added thereto. Then, the pressure was reduced to 0.3 Torr while elevating the temperature to 285° C. to obtain polyesters different in viscosity by changing the reaction time. Dyes described in JP-A-7-168309, compounds I-6 and I-24, were each further added to the solid matter in an amount of 54 ppm. The copolymerization composition ratios of cyclohexanedimethanol (CHDM) and the intrinsic viscosities of the polyesters are shown in Table II-1.

(d) Examples 11-9 and II-10:

Dimethyl 2,6-naphthalenedicarboxylate and dimethyl isophthalate were dispersed in $HO(CH_2CH_2O)_{80}OH$ (OEG) and ethylene glycol. Then, 0.029 part of manganese acetate tetrahydrate, 0.028 parts of antimony trioxide and 0.1% of spherical silica particles having a mean particle size of 0.3 μm were added to 100 parts of the total of dimethyl 2,6-naphthalenedicarboxylate and dimethyl isophthalate, and heated with stirring to conduct the reaction. The temperature was elevated to 235° C. while removing methanol produced as a by-product. After the by-production of methanol was completed, 0.03 part of trimethyl phosphate was added thereto. Then, the pressure was reduced to 0.3 Torr while elevating the temperature to 285° C., thereby conducting the polymerization. Dyes described in JP-A-7-168309, compounds I-6 and I-24, were each further added to the solid matter in an amount of 54 ppm. The copolymerization ratios of isophthalic acid (IPA) and $HO(CH_2CH_2O)_{80}OH$ (OEG) and the intrinsic viscosities of polyesters thus obtained are shown in Table II-1.

(e) Examples II-11 and II-12

Dimethyl 2,6-naphthalenedicarboxylate (100 parts) and methyl ester of p-hydroxyethoxybenzoic acid (PHBA) (10 parts) were dispersed in neopentyl glycol (NPG) and ethylene glycol. Then, 0.029 part of manganese acetate tetrahydrate, 0.028 parts of antimony trioxide and 0.1% of spherical silica particles having a mean particle size of 0.3 μm were added to 100 parts of dimethyl 2,6-naphthalenedicarboxylate, and heated with stirring to conduct the reaction. The temperature was elevated to 235° C. while removing methanol produced as a by-product. After the by-production of methanol was completed, 0.03 part of trimethyl phosphate was added thereto. Then, the pressure was reduced to 0.3 Torr while elevating the temperature to 285° C., thereby conducting the polymerization. Dyes described in JP-A-7-168309, compounds I-6 and I-24, were each further added to the solid matter in an amount of 54 ppm. The copolymerization ratios of NPG and the intrinsic viscosities of polyesters thus obtained are shown in Table II-1.

(f) Example II-13

Dimethyl 2,6-naphthalenedicarboxylate and dimethyl sebacate were dispersed in ethylene glycol. Then, 0.029 part of manganese acetate tetrahydrate, 0.028 parts of antimony trioxide and 0.1% of spherical silica particles having a mean particle size of 0.3 μm were added to 100 parts of the total of dimethyl 2,6-naphthalenedicarboxylate and dimethyl sebacate, and heated with stirring to conduct the reaction. The temperature was elevated to 235° C. while removing methanol produced as a by-product. After the by-production of methanol was completed, 0.03 part of trimethyl phosphate was added thereto. Then, the pressure was reduced to 0.3 Torr while elevating the temperature to 285° C., thereby conducting the polymerization. Dyes described in JP-A-7-168309, compounds 1-6 and I-24, were each further added to the solid matter in an amount of 54 ppm. The copolymerization ratio of sebacic acid (SA) and the intrinsic viscosity of a polyester thus obtained are shown in Table II-1.

(g) Example II-14

Dimethyl 2,6-naphthalenedicarboxylate was dispersed in ethylene glycol and an addition product of two ethylene oxides to bisphenol A (BPA•2EO). Then, 0.029 part of manganese acetate tetrahydrate, 0.028 parts of antimony trioxide and 0.1% of spherical silica particles having a mean particle size of 0.3 μm were added to 100 parts of dimethyl 2,6-naphthalenedicarboxylate, and heated with stirring to conduct the reaction. The temperature was elevated to 235° C. while removing methanol produced as a by-product. After the by-production of methanol was completed, 0.03 part of trimethyl phosphate was added thereto. Then, the pressure was reduced to 0.3 Torr while elevating the temperature to 285° C. to conduct the polymerization. Dyes described in JP-A-7-168309, compounds I-6 and I-24, were each further added to the solid matter in an amount of 54 ppm. The copolymerization composition ratio of BPA•2EO and the intrinsic viscosities of a polyester thus obtained are shown in Table II-1.

Preparation of Polymer Blends (a) Example II-15

Commercially available polycyclohexanedimethanol terephthalate (PCT) and PEN having an intrinsic viscosity of 0.58 were mixed in a ratio of 15:85. After dried at 160° C. for 2 hours, the resulting mixture was kneaded and extruded at 310° C. by use of a twin-screw extruder. Thus, a polymer blend having an intrinsic viscosity of 0.53 was obtained.

(b) Example II-16

PEN having an intrinsic viscosity of 0.53 and the copolyester of Example II-4 were mixed in a blend ratio shown in Table II-1. After dried at 160° C. for 2 hours, the resulting mixture was kneaded and extruded at 310° C. by use of a twin-screw extruder. Thus, a polymer blend having an intrinsic viscosity of 0.51.

(c) Example II-17

PEN of Example II-1 (intrinsic viscosity =0.35) and the copolyester of Example II-9 were mixed in a blend ratio shown in Table II-1. After dried at 160° C. for 2 hours, the resulting mixture was kneaded and extruded at 310° C. by use of a twin-screw extruder. Thus, a polymer blend having an intrinsic viscosity of 0.60.

(d) Examples II-18 and II-19

After dried at 160° C. for 2 hours, two kinds of PEN polymers different in viscosity shown in Table II-1 were kneaded and extruded at 310° C. by use of a twin-screw extruder.

(e) Example 11-20

Commercially available polycyclohexanedimethanol terephthalate (PCT), polyarylate (PAr) and PEN having an intrinsic viscosity of 0.58 were mixed in a ratio of 10:35:55. After dried at 160° C. for 2 hours, the resulting mixture was kneaded and extruded at 310° C. by use of a twin-screw extruder.

(1-2) Polymerization of Polyesters for Comparison

PEN having an intrinsic viscosity shown in Table II-1 was obtained by polymerization according to invention 3 of JP-A-11-202446.

TABLE II-1

Composition of Supports

| | Copolymerization Components of Polyester Composition | | | | | | Copolymerization Components of Polyester Composition to Be Blended | | | | | |
|---|---|---|---|---|---|---|---|---|---|---|---|---|
| | Dicarboxylic Acid | | Diol | | Intrinsic | | Dicarboxylic Acid | | Diol | | Intrinsic | |
| | Component | Content[a)] wt % | Component | Content[b)] wt % | sic Viscosity | Blend Ratio wt % | Component | Content[a)] wt % | Component | Content[b)] wt % | sic Viscosity | Blend Ratio wt % |
| Example II-1 | — | — | — | — | 0.52 | 100 | | | | | | |
| Example II-2 | — | — | — | — | 0.45 | 100 | | | | | | |
| Example II-3 | — | — | — | — | 0.38 | 100 | | | | | | |
| Example II-4 | SA | 10 | BPA · 2 EO | 10 | 0.52 | 100 | | | | | | |
| Example II-5 | SA | 20 | BPA · 2 EO | 25 | 0.65 | 100 | | | | | | |
| Example II-6 | — | — | CHDM | 3 | 0.48 | 100 | | | | | | |
| Example II-7 | — | — | CHDM | 8 | 0.53 | 100 | | | | | | |
| Example II-8 | — | — | CHDM | 20 | 0.57 | 100 | | | | | | |
| Example II-9 | IPA | 2 | OEG | 2 | 0.80 | 100 | | | | | | |
| Example II-10 | IPA | 10 | OEG | 15 | 0.42 | 100 | | | | | | |
| Example II-11 | — | —<br>PHBA | NPG | 25<br>10 | 0.62 | 100 | | | | | | |
| Example II-12 | — | —<br>PHBA | NPG | 8<br>10 | 0.37 | 100 | | | | | | |
| Example II-13 | SA | 10 | — | — | 0.37 | 100 | | | | | | |
| Example II-14 | — | — | BPA · 2 EO | 10 | 0.45 | 100 | | | | | | |
| Example II-15 | — | — | — | — | 0.58 | 85 | Polycyclohexanedimethanol terephthalate | | | | 0.45 | 15 |
| Example II-16 | — | — | — | — | 0.54 | 93 | — | — | CHDM | 50 | 0.44 | 7 |
| Example II-17 | — | — | — | — | 0.23 | 43 | IPA | 2 | OEG | 2 | 0.78 | 57 |
| Example II-18 | — | — | — | — | 0.58 | 80 | — | — | — | — | 0.35 | 20 |
| Example II-19 | — | — | — | — | 0.55 | 60 | — | — | — | — | 0.40 | 40 |
| Example II-20 | — | — | — | — | 0.58 | 55 | Polycyclohexanedimethanol terephthalate<br>Polyarylate | | | | 0.45<br>0.55 | 10<br>35 |
| Comparison | — | — | — | — | 0.58 | 78 | — | — | — | — | 0.40 | 22 |

[a)]Content to naphthalenedicarboxylic acid,
[b)]Content to ethylene glycol (2) Preparation of Polyester Supports In the present invention, each of the polyesters prepared by the above-mentioned methods was formed into pellets, which were dried under reduced pressure at 160° C. for 3 hours. The pellets were melted at 310° C. by use of two single-screw extruders installed in tandem with each other. Then, the melt was filtered through a 5-$\mu$m mesh filter, and extruded through a T die onto an electrostatically charged casting drum kept at 50° C. to prepare an unstretched film. This film was subjected to multistage MD stretching, multistage TD stretching, multistage heat setting and anisotropic quenching under the conditions shown in Table II-2.

In comparison, a PEN film was formed which was stretched larger in TD than in MD according to "invention 1 of JP-A-10-293381".

Each of the formed films had a width of 1.8 m, and both edges thereof were trimmed to a width of 1.5 m. Then, both edges were subjected to knurling treatment so as to give knurls having a height of 30 $\mu$m and a width of 10 mm. The resulting films each having a length of 3000 m were then wound around core tubes having a diameter of 30 cm.

TABLE II-2

Conditions of Film Formation

| | Stretching | | | | | | | | | | | |
|---|---|---|---|---|---|---|---|---|---|---|---|---|
| | First MD Stretching | | | First TD Stretching | | | Second MD Stretching | | | Second TD Stretching | | |
| | Ratio | Temp. ° C. | Speed %/sec | Ratio | Temp. ° C. | Speed %/sec | Ratio | Temp. ° C. | Speed %/sec | Ratio | Temp. ° C. | Speed %/sec |
| Example II-1 | 1.5 | 132 | 100 | 1.4 | 135 | 150 | 1.7 | 133 | 130 | 2.0 | 137 | 200 |
| Example II-2 | 1.5 | 130 | 70 | 1.1 | 134 | 80 | 2.0 | 131 | 100 | 3.0 | 136 | 120 |
| Example II-3 | 2.2 | 128 | 130 | 1.9 | 133 | 140 | 1.7 | 130 | 200 | 2.0 | 135 | 220 |
| Example II-4 | 1.7 | 99 | 280 | 2.1 | 103 | 260 | 1.6 | 100 | 100 | 1.8 | 105 | 130 |
| Example II-5 | 1.1 | 93 | 280 | 1.6 | 94 | 230 | 3.4 | 95 | 80 | 1.6 | 97 | 80 |
| Example II-6 | 1.4 | 138 | 150 | 1.9 | 140 | 180 | 2.3 | 140 | 100 | 1.8 | 142 | 80 |
| Example II-7 | 1.7 | 143 | 90 | 2.0 | 143 | 120 | 1.6 | 143 | 110 | 1.5 | 146 | 150 |
| Example II-8 | 1.3 | 149 | 110 | 1.4 | 149 | 160 | 1.7 | 150 | 90 | 1.8 | 151 | 180 |
| Example II-9 | 2.2 | 121 | 10 | 3.0 | 124 | 30 | 1.7 | 128 | 200 | 1.5 | 135 | 240 |
| Example II-10 | 1.8 | 110 | 30 | 1.9 | 135 | 40 | 2.4 | 140 | 80 | 1.9 | 135 | 100 |
| Example II-11 | 3.0 | 100 | 60 | 2.7 | 120 | 100 | 1.1 | 130 | 180 | 1.6 | 130 | 200 |
| Example II-12 | 1.2 | 115 | 200 | 2.0 | 130 | 250 | 3.4 | 130 | 100 | 1.5 | 140 | 100 |
| Example II-13 | 1.6 | 107 | 140 | 2.8 | 110 | 200 | 2.4 | 118 | 60 | 1.1 | 121 | 180 |
| Example II-14 | 1.1 | 140 | 130 | 1.8 | 136 | 80 | 3.0 | 143 | 90 | 1.7 | 140 | 50 |
| Example II-15 | 2.2 | 135 | 110 | 1.1 | 136 | 80 | 1.5 | 139 | 280 | 3.3 | 140 | 100 |
| Example II-16 | 1.4 | 133 | 190 | 1.8 | 138 | 100 | 2.1 | 138 | 240 | 2.1 | 139 | 150 |
| Example II-17 | 2.1 | 115 | 210 | 3.0 | 115 | 50 | 1.4 | 115 | 300 | 1.3 | 117 | 70 |
| Example II-18 | 1.8 | 122 | 100 | 1.7 | 130 | 130 | 2.2 | 135 | 60 | 2.2 | 130 | 190 |
| Example II-19 | 1.5 | 123 | 180 | 2.1 | 134 | 200 | 2.1 | 138 | 80 | 1.6 | 138 | 120 |
| Example II-20 | 1.4 | 155 | 240 | 1.5 | 157 | 240 | 2.4 | 158 | 240 | 2.0 | 159 | 240 |
| Comparison | 3.3 | 110 | 100 | 1.65 | 125 | 100 | — | — | — | 2 | 135 | 100 |

| | Total MD Ratio/ Total TD Ratio | Heat Setting | | | | | | Anisotropic Quenching | |
|---|---|---|---|---|---|---|---|---|---|
| | | First Heat Setting | | | Second Heat Setting | | | Difference in Temp. | Cooling |
| | | Temp. ° C. | Time sec. | Contraction % | Temp. ° C. | Time sec. | Contraction % | inside-outside ° C. | Time sec. |
| Example II-1 | 0.91 | 200 | 20 | 1 | 185 | 15 | 3 | 20 | 20 |
| Example II-2 | 0.91 | 215 | 10 | 0 | 213 | 20 | 2 | 25 | 15 |
| Example II-3 | 0.98 | 200 | 30 | 2 | 190 | 20 | 0 | 30 | 25 |
| Example II-4 | 0.72 | 170 | 60 | 0 | 160 | 70 | 1 | 14 | 30 |
| Example II-5 | 1.46 | 155 | 100 | 1 | 150 | 80 | 0 | 15 | 35 |
| Example II-6 | 0.94 | 210 | 20 | 2 | 190 | 30 | 1 | 18 | 22 |
| Example II-7 | 0.91 | 204 | 10 | 1 | 200 | 40 | 1 | 16 | 17 |
| Example II-8 | 0.88 | 230 | 20 | 0 | 215 | 20 | 1 | 27 | 28 |
| Example II-9 | 0.83 | 200 | 5 | 0 | 170 | 10 | 9 | 12 | 38 |
| Example II-10 | 1.20 | 215 | 10 | 1 | 190 | 5 | 5 | 10 | 40 |
| Example II-11 | 0.76 | 195 | 80 | 6 | 165 | 60 | 0 | 48 | 3 |
| Example II-12 | 1.36 | 220 | 40 | 2 | 200 | 40 | 3 | 44 | 14 |
| Example II-13 | 1.25 | 205 | 60 | 3 | 195 | 50 | 1 | 40 | 17 |
| Example II-14 | 1.08 | 215 | 10 | 2 | 190 | 70 | 1 | 43 | 19 |
| Example II-15 | 0.91 | 200 | 20 | 1 | 198 | 35 | 2 | 25 | 14 |
| Example II-16 | 0.88 | 200 | 10 | 0 | 180 | 80 | 2 | 30 | 5 |
| Example II-17 | 0.75 | 177 | 30 | 2 | 170 | 10 | 3 | 15 | 15 |
| Example II-18 | 0.94 | 220 | 45 | 2 | 215 | 50 | 1 | 13 | 10 |
| Example II-19 | 0.94 | 230 | 30 | 1 | 200 | 10 | 2 | 11 | 6 |
| Example II-20 | 1.12 | 255 | 3 | 0 | 250 | 3 | 1 | 12 | 7 |
| Comparison | 1.0 | 180 | 5 | 0 | 225 | 15 | 5 | 0 | 60 |

(3) Evaluation of Supports

The supports of the present invention and comparison thus obtained were evaluated, and results thereof are shown in Table II-3. For each sample, measurements were made at edge portions (10 cm from trimmed edges) in film formation and a center portion, which showed the greatest orientation angle. A Strograph R2 type tensile tester manufactured by Toyo Seiki Co., Ltd. was used for measuring the breaking elongation and the breaking strength.

TABLE II-3

Evaluation of Supports

| | Breaking Strength | | | Breaking Elongation | | | Young's Modulus | | | Notch Forming Strengh | | |
|---|---|---|---|---|---|---|---|---|---|---|---|---|
| | MD kg/mm$^2$ | TD kg/mm$^2$ | MD/TD | MD % | TD % | MD/TD | MD kg/mm$^2$ | TD kg/mm$^2$ | MD/TD | MD g | TD g | MD/TD |
| Example II-1 | 11 | 12 | 0.92 | 80 | 75 | 1.07 | 520 | 530 | 0.98 | 1400 | 1150 | 1.22 |
| Example II-2 | 10 | 11 | 0.91 | 75 | 65 | 1.15 | 500 | 520 | 0.96 | 1200 | 1030 | 1.16 |
| Example II-3 | 9 | 10 | 0.90 | 60 | 60 | 1.00 | 480 | 490 | 0.98 | 1180 | 900 | 1.31 |
| Example II-4 | 7 | 10 | 0.70 | 120 | 100 | 1.20 | 400 | 550 | 0.73 | 800 | 650 | 1.23 |
| Example II-5 | 8 | 8 | 1.33 | 90 | 125 | 0.72 | 580 | 420 | 1.38 | 430 | 600 | 0.72 |
| Example II-6 | 13 | 14 | 0.93 | 60 | 50 | 1.20 | 570 | 520 | 1.10 | 1200 | 1030 | 1.17 |
| Example II-7 | 12 | 13 | 0.92 | 50 | 50 | 1.00 | 530 | 550 | 0.96 | 980 | 1000 | 0.98 |
| Example II-8 | 11 | 12 | 0.92 | 45 | 40 | 1.13 | 460 | 500 | 0.92 | 930 | 820 | 1.13 |
| Example II-9 | 8 | 9 | 0.89 | 130 | 110 | 1.19 | 440 | 480 | 0.92 | 730 | 600 | 1.22 |
| Example II-10 | 7 | 5 | 1.40 | 110 | 135 | 0.81 | 520 | 410 | 1.27 | 520 | 590 | 0.88 |
| Example II-11 | 18 | 13 | 1.38 | 23 | 30 | 0.77 | 650 | 590 | 1.10 | 1500 | 2030 | 0.74 |
| Example II-12 | 18 | 15 | 1.07 | 20 | 20 | 1.00 | 620 | 600 | 1.03 | 1600 | 1820 | 0.88 |
| Example II-13 | 13 | 12 | 1.08 | 80 | 90 | 0.89 | 550 | 530 | 1.04 | 1500 | 1510 | 0.99 |
| Example II-14 | 12 | 12 | 1.00 | 70 | 85 | 0.83 | 540 | 540 | 1.00 | 1270 | 1300 | 0.98 |
| Example II-15 | 10 | 12 | 0.83 | 80 | 60 | 1.33 | 500 | 590 | 0.84 | 1310 | 950 | 1.38 |
| Example II-16 | 10 | 11 | 0.91 | 55 | 50 | 1.10 | 520 | 530 | 0.98 | 930 | 1010 | 0.92 |
| Example II-17 | 7 | 9 | 0.77 | 135 | 100 | 1.35 | 410 | 570 | 0.72 | 780 | 570 | 1.37 |
| Example II-18 | 9 | 9 | 1.00 | 50 | 55 | 0.91 | 460 | 460 | 1.00 | 820 | 700 | 1.17 |
| Example II-19 | 9 | 10 | 0.90 | 60 | 50 | 1.20 | 430 | 450 | 0.96 | 850 | 780 | 1.09 |
| Example II-20 | 8 | 8 | 1.00 | 90 | 100 | 0.90 | 450 | 470 | 0.96 | 600 | 700 | 0.86 |
| Comparison | 23 | 25 | 0.92 | 270 | 300 | 0.90 | 660 | 680 | 0.97 | 2310 | 2400 | 0.96 |

| | Cutting Properties | | | | Thickness | | | Change in Dimension, 100° C., 24 hr. | | Total Light Transmit- | | |
|---|---|---|---|---|---|---|---|---|---|---|---|---|
| | Cutting Load | | Poor Cutting | | Aver- | Unevenness | | | | | | |
| | MD g | TD g | MD % | TD % | age $\mu$m | MD $\mu$m | TD $\mu$m | MD % | TD % | tance % | Haze % | Tg ° C. |
| Example II-1 | 630 | 630 | 0 | 0 | 100 | 2 | 3 | 0.15 | 0.13 | 93 | 0.3 | 119 |
| Example II-2 | 620 | 620 | 0 | 0 | 95 | 3 | 4 | 0.11 | 0.12 | 94 | 0.2 | 119 |
| Example II-3 | 610 | 620 | 0 | 0 | 90 | 4 | 5 | 0.08 | 0.09 | 90 | 0.4 | 118 |
| Example II-4 | 570 | 610 | 0 | 0 | 140 | 3 | 4 | 0.22 | 0.25 | 85 | 0.6 | 90 |
| Example II-5 | 600 | 500 | 0 | 0 | 160 | 4 | 3 | 0.27 | 0.29 | 80 | 0.9 | 88 |
| Example II-6 | 610 | 610 | 0 | 0 | 115 | 4 | 4 | 0.14 | 0.18 | 95 | 0.1 | 121 |
| Example II-7 | 600 | 600 | 0 | 0 | 110 | 4 | 5 | 0.10 | 0.11 | 94 | 0.1 | 125 |
| Example II-8 | 590 | 590 | 0 | 0 | 105 | 8 | 6 | 0.07 | 0.06 | 93 | 0.3 | 135 |
| Example II-9 | 580 | 580 | 0 | 0 | 170 | 1 | 2 | 0.11 | 0.14 | 88 | 0.5 | 110 |
| Example II-10 | 560 | 560 | 0 | 0 | 190 | 1 | 1 | 0.09 | 0.11 | 84 | 0.7 | 100 |
| Example II-11 | 670 | 690 | 1 | 1 | 70 | 2 | 2 | 0.18 | 0.22 | 82 | 0.8 | 95 |
| Example II-12 | 660 | 650 | 1 | 0 | 80 | 3 | 1 | 0.16 | 0.18 | 80 | 0.9 | 100 |
| Example II-13 | 650 | 640 | 0 | 0 | 85 | 4 | 5 | 0.14 | 0.16 | 88 | 0.5 | 99 |
| Example II-14 | 620 | 620 | 0 | 0 | 90 | 3 | 3 | 0.12 | 0.15 | 90 | 0.4 | 130 |
| Example II-15 | 580 | 610 | 0 | 0 | 90 | 3 | 4 | 0.14 | 0.18 | 91 | 0.4 | 130 |
| Example II-16 | 560 | 580 | 0 | 0 | 95 | 3 | 3 | 0.12 | 0.14 | 92 | 0.3 | 123 |
| Example II-17 | 500 | 580 | 0 | 0 | 180 | 4 | 5 | 0.22 | 0.27 | 76 | 1.2 | 108 |
| Example II-18 | 580 | 590 | 0 | 0 | 105 | 5 | 4 | 0.10 | 0.11 | 89 | 0.5 | 119 |
| Example II-19 | 590 | 590 | 0 | 0 | 110 | 4 | 3 | 0.05 | 0.08 | 91 | 0.4 | 119 |
| Example II-20 | 570 | 580 | 0 | 0 | 150 | 3 | 4 | 0.02 | 0.04 | 72 | 1.4 | 148 |
| Comparison | 1030 | 1090 | 5 | 7 | 90 | 12 | 19 | 0.40 | 0.38 | 73 | 2.2 | 111 |

(4) Surface Treatment, and Coating of Undercoat and Back Layers

Each of the supports of the present invention and comparison prepared by the above-mentioned methods was subjected to surface treatment according to the following glow discharge treatment or corona discharge treatment (each indicated by "glow" or "corona" in Table II-4), and coated with a first back layer, an undercoat layer and a second back layer in this order.

Further, each of the resulting supports was heat treated at a temperature of (Tg of each support—5° C.) for a time shown in Table II-4 (BTA treatment), according to Example 1 of JP-A-8-57951, between the formation of the first back layer and that of the undercoat layer. In the present invention, the undercoat layer was provided on a higher temperature side of the support in anisotropic quenching.

Then, the curl given by winding and the quantity of heat of an endothermic peak appearing at 100° C. to 170° C. were measured, and results thereof are shown in Table II-4.

(i) Glow Discharge Treatment

The support was subjected to the glow discharge treatment, and coated with the first back layer, the undercoat layer, the second back layer and a third back layer according to the description of Example 1 of JP-A-8-57951.

(ii) Corona Discharge Treatment

As described in Comparative Example I of JP-A-9-106045, the support was subjected to the corona discharge treatment, and coated with first and second undercoat layers. On the opposite side, an antistatic layer (the first back layer) and a surface layer (the second back layer) were formed.

(5) Preparation and Evaluation of Photographic Materials

One of the following photographic materials was provided on an undercoat layer side as shown in Table II-4.

Color negative photographic material: the same as sample 201 of Example 2 of JP-A-9-146237 (indicated by CN in Table I-4)

Color reversal photographic material: the same as sample 101 of Example 1 of JP-A-11-84601 (indicated by CR in Table I-4)

The resulting photographic materials were slit to a width of 135 system photographic materials (35 mm). Then, the notch forming strength was evaluated by the above-mentioned method, and the cutting properties were evaluated by the following methods. Results thereof are shown in Table II-4.

TABLE II-4

Preparation and Evaluation of Photographic Materials

| | Preparation of Photographic Materials | | | | Evaluation of Photographic Materials | | | | |
|---|---|---|---|---|---|---|---|---|---|
| | | BTA Treatment | | | Cutting Load | | | Poor Cutting | |
| | Surface Treatment | BTA Time hr | Endothermic Peak J/g | Kind of Photographic Material Provided | MD g | TD g | MD/TD | MD % | TD % |
| Example II-1 | Corona | 5 | 0.8 | CN | 630 | 650 | 0.97 | 0 | 0 |
| Example II-2 | Glow | 12 | 1.0 | CN | 620 | 650 | 0.95 | 0 | 0 |
| Example II-3 | Corona | 24 | 1.4 | CR | 630 | 640 | 0.98 | 0 | 0 |
| Example II-4 | Glow | 150 | 3.3 | CN | 580 | 630 | 0.89 | 0 | 0 |
| Example II-5 | Corona | 200 | 4.0 | CR | 630 | 500 | 1.26 | 0 | 0 |
| Example II-6 | Glow | 72 | 1.8 | CN | 660 | 690 | 0.96 | 0 | 0 |
| Example II-7 | Corona | 36 | 1.6 | CR | 660 | 660 | 1.00 | 0 | 0 |
| Example II-8 | Glow | 48 | 1.7 | CN | 640 | 650 | 0.98 | 0 | 0 |
| Example II-9 | Corona | 300 | 4.5 | CR | 600 | 620 | 0.97 | 0 | 0 |
| Example II-10 | Glow | 360 | 4.8 | CN | 600 | 530 | 1.13 | 0 | 0 |
| Example II-11 | Corona | 480 | 5.0 | CN | 700 | 600 | 1.17 | 1 | 1 |
| Example II-12 | Glow | 100 | 3.0 | CR | 680 | 670 | 1.01 | 1 | 0 |
| Example II-13 | Corona | 3 | 0.4 | CN | 650 | 640 | 1.02 | 0 | 0 |
| Example II-14 | Glow | 1 | 0.3 | CR | 630 | 620 | 1.02 | 0 | 0 |
| Example II-15 | Corona | 8 | 0.9 | CN | 600 | 640 | 0.94 | 0 | 0 |
| Example II-16 | Glow | 16 | 1.2 | CR | 590 | 600 | 0.98 | 0 | 0 |
| Example II-17 | Corona | 60 | 1.7 | CN | 500 | 610 | 0.82 | 0 | 0 |
| Example II-18 | Glow | 96 | 2.9 | CR | 610 | 610 | 1.00 | 0 | 0 |
| Example II-19 | Corona | 10 | 0.9 | CN | 600 | 640 | 0.94 | 0 | 0 |
| Example II-20 | Glow | 30 | 1.5 | CN | 610 | 600 | 1.02 | 0 | 0 |
| Comparison | Corona | 24 | 1.5 | CN | 1060 | 1130 | 0.9 | 7 | 9 |

| | Evaluation of Photographic Materials | | | | | | | |
|---|---|---|---|---|---|---|---|---|
| | Notch Forming Properties | | | | | Curl Given by Winding | Gutter-like Curl | Number of Scratches/ |
| | Notch Forming Strength | | | Flash Occurrence | | | | |
| | MD g | TD g | MD/TD | MD % | TD % | $m^{-1}$ | $m^{-1}$ | $m^2$ |
| Example II-1 | 1430 | 1210 | 1.18 | 0 | 0 | 110 | 36 | 0 |
| Example II-2 | 1250 | 1050 | 1.19 | 0 | 0 | 100 | 37 | 0 |
| Example II-3 | 1200 | 950 | 1.26 | 0 | 0 | 90 | 38 | 0 |
| Example II-4 | 840 | 700 | 1.20 | 0 | 0 | 45 | 42 | 0 |
| Example II-5 | 480 | 650 | 0.74 | 1 | 0 | 40 | 44 | 0 |
| Example II-6 | 1250 | 1100 | 1.14 | 0 | 0 | 70 | 40 | 0 |
| Example II-7 | 1030 | 1040 | 0.99 | 0 | 0 | 85 | 43 | 0 |
| Example II-8 | 960 | 850 | 1.13 | 0 | 0 | 80 | 49 | 0 |
| Example II-9 | 760 | 630 | 1.21 | 0 | 0 | 35 | 51 | 1 |
| Example II-10 | 550 | 620 | 0.89 | 1 | 0 | 33 | 54 | 1 |
| Example II-11 | 1530 | 2080 | 0.74 | 0 | 0 | 50 | 20 | 0 |
| Example II-12 | 1630 | 1880 | 0.87 | 0 | 0 | 48 | 22 | 0 |
| Example II-13 | 1530 | 1550 | 0.99 | 0 | 0 | 120 | 25 | 0 |
| Example II-14 | 1280 | 1320 | 0.97 | 0 | 0 | 140 | 28 | 0 |
| Example II-15 | 1350 | 1000 | 1.35 | 0 | 0 | 105 | 30 | 0 |
| Example II-16 | 960 | 1050 | 0.91 | 0 | 0 | 95 | 33 | 0 |
| Example II-17 | 830 | 620 | 1.34 | 0 | 1 | 72 | 45 | 0 |
| Example II-18 | 870 | 760 | 1.14 | 0 | 0 | 47 | 48 | 0 |
| Example II-19 | 900 | 800 | 1.13 | 0 | 0 | 103 | 50 | 0 |
| Example II-20 | 650 | 730 | 0.89 | 0 | 0 | 88 | 49 | 0 |
| Comparison | 2350 | 2430 | 0.97 | 9 | 11 | 100 | 70 | 15 |

(1) Evaluation Methods of Cutting Properties (a) Cutting Load

1) A sample film was slit to a width of 35 mm in MD and TD.

2) A load of a cutter handle of a cutter inserter (type ENV-M4) manufactured by Noritz Corp. was applied thereto, and a load required to cut the whole width of 35 mm was determined.

(b) Poor Cutting

1) Evaluation was made using a cutter contained in a miniature laboratory developing machine (type FP550B, manufactured by Fuji Photo Film Co., Ltd.).

2) A sample film was cut using "const (constant length mode)". In the ordinary mode, tension is applied to a photographic material in cutting. However, in the const mode, no tension is applied, so that cutting is difficult, resulting in severer evaluation.

3) As a cutter blade, one allowed to wear until the width of a tip thereof became 0.1 mm was used. A blade used for several years or more is simulated.

4) The same sample was cut 100 times, and evaluated as described below to determine the occurrence of poor cutting (when even a part could not be cut). 3% or less is allowable (2) Notch Forming Properties (a) Notch Forming Strength According to the above-mentioned method, 100 measurements were made in MD and TD, respectively, and the average values thereof were determined.

(b) Rate of Occurrence of Flashes

The samples in which the notch forming strength was measured were observed under a stereoscopic microscope of 50 magnifications, and the rate of occurrence was determined from the number of the samples in which flashes were observed. 3% or less is allowable.

(3) Number of Occurrence of Scratches

1) After development, a sample photographic material film was slit to a size 35 mm wide in TD and 1.5 m long in MD.

2) This slit film was subjected to notch forming treatment at 25° C. at 10% RH using an FNP 7000D notcher puncher manufactured by Fuji Photo Film Co., Ltd.

3) The number of scratches generated on a back face of this film was visually counted under a point light source (a 100-W tungsten lamp). The number of scratches generated was indicated by standardizing it to the number per $m^2$. Preferred is 5 scratches/$m^2$ or less, and more preferred is 3 scratches/$m^2$ or less.

The polyester supports excellent in cutting properties (film cutting and notch forming properties) in a photofinishing laboratory (processing laboratory), excellent in handling properties, and difficult to develop scratches, and the silver halide photographic materials using the same were obtained by the polyester films having both transverse direction (TD) and machine direction (MD) breaking strengths of 5 kg/$mm^2$ to 18 kg/$mm^2$, and both TD and MD Young's moduli of 400 kg/$mm^2$ to 650 kg/$mm^2$.

While the invention has been described in detail and with reference to specific embodiments thereof, it will be apparent to one skilled in the art that various changes and modification can be made therein without departing from the spirit and scope thereof.

What is claimed is:

1. A polyester support having both transverse direction (TD) and machine direction (MD) breaking strengths of from 5 kg/$mm^2$ to 18 kg/$mm^2$, and both TD and MD breaking elongations of from 20% to 140%.

2. The polyester support as in claim 1, wherein both the TD and MD Young's moduli are from 400 kg/$mm^2$ to 650 kg/$mm^2$.

3. The polyester support as in claim 1, wherein both the TD and MD notch forming strengths are from 300 g to 2100 g.

4. The polyester support as in claim 1, wherein the notch forming strength ratio (TD/MD) is from 0.6 to 1.5, and the breaking strength ratio (TD/MD) is from 0.6 to 1.5.

5. The polyester support as in claim 1, wherein the TD/MD ratios of breaking strength, Young's modulus and notch forming strength are from 0.7 to 1.4.

6. The polyester support as in claim 1, wherein the orientation angle at both edges is from 0 degree to 40 degrees.

7. The polyester support as in claim 1, wherein the thickness unevenness in TD is from 0 $\mu$m to 8 $\mu$m, and the thickness unevenness in MD is from 0 $\mu$m to 8 $\mu$m.

8. The polyester support as in claim 1, wherein the total light transmittance is from 70% to 98%, the haze is from 0% to 2%, the thickness is from 70 $\mu$m to 200 $\mu$m, and the rate of change in dimension at 100° C. for 24 hours is from 0% to 0.3% in both MD and TD.

9. The polyester support as in claim 1, wherein the total light transmittance is from 70% to 98%, the haze is from 0% to 2%, the thickness is from 70 $\mu$m to 200 $\mu$m, the rate of change in dimension at 100° C. for 24 hours is from 0% to 0.3% in both MD and TD, and both the thickness unevenness in TD and the thickness unevenness in MD are from 0 $\mu$m to 8 $\mu$m.

10. The polyester support as in claim 1, wherein said polyester support is composed of 50 mol % to 100 mol % of naphthalenedicarboxylic acid residues and 50 mol % to 100 mol % of ethylene glycol residues, and has a glass transition temperature (Tg) of from 85° C. to 150° C.

11. The polyester support as in claim 10, wherein said polyester support is composed of 50 mol % to 100 mol % of naphthalenedicarboxylic acid residues, 0 mol % to 50 mol % of straight-chain, branched or cyclic dicarboxylic acid residues having from 3 to 30 carbon atoms or phthalic acid residues, as a dicarboxylic acid residue; and 50 mol % to 100 mol % of ethylene glycol residues and 0 mol % to 50 mol % of $H—O—[(CH_2)_n—O]_m—H$ residues (wherein n=an integer of from 2 to 6 and m=an integer of from 2 to 30) and/or $H—(OCH_2CH_2)_n—O—B—R—B—O—(CH_2CH_2O)_m—H$ residues (wherein n=an integer of from 1 to 3, m=an integer of from 1 to 3, n and m may be the same or different, R represents —O—, —S—, $—CH_2—$ or $—C(CH_3)_2—$, and B represents a benzene ring) and/or straight-chain, cyclic or branched diol residues having from 3 to 30 carbon atoms, as diol residues.

12. The polyester support as in claim 1, wherein said polyester support is heat treated at a temperature of from 50° C. to a glass transition temperature (Tg) of said polyester support, and has an endothermic peak of from 0.3 J/g to 5 J/g at 100° C. to 170° C.

13. A roll-shaped silver halide photographic material wound along a machine direction (MD) and comprising a polyester support having both transverse direction (TD) and machine direction (MD) breaking strengths of from 5 kg/$mm^2$ to 18 kg/$mm^2$, and both TD and MD breaking elongations of from 20% to 140%.

14. The roll-shaped silver halide photographic material as in claim 13, wherein the gutter-shaped curl is from 20 $m^{-1}$ to 55 $m^{-1}$, and the curl given by winding is from 30 $m^{-1}$ to 140 $m^{-1}$.

* * * * *